US012621221B2

(12) United States Patent
Grey et al.

(10) Patent No.: US 12,621,221 B2
(45) Date of Patent: *May 5, 2026

(54) SYSTEMS AND METHODS FOR APPLYING A PROXY MODEL OF NETWORK QUALITY TO ADJUST NETWORK HARDWARE OR SOFTWARE

(71) Applicant: GOGO BUSINESS AVIATION LLC, Broomfield, CO (US)

(72) Inventors: Pearl Grey, Broomfield, CO (US); Jen Pardi-Cusick, Westminster, CO (US); Jeff Osoba, Broomfield, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/625,822

(22) Filed: Apr. 3, 2024

(65) Prior Publication Data
US 2024/0333608 A1 Oct. 3, 2024

Related U.S. Application Data

(60) Provisional application No. 63/493,983, filed on Apr. 3, 2023.

(51) Int. Cl.
*G06F 15/16* (2006.01)
*H04L 41/16* (2022.01)
(Continued)

(52) U.S. Cl.
CPC .......... *H04L 41/5009* (2013.01); *H04L 41/16* (2013.01); *H04L 67/12* (2013.01)

(58) Field of Classification Search
CPC ...... H04L 41/5067; H04L 41/16; H04L 67/12
See application file for complete search history.

(56) References Cited

U.S. PATENT DOCUMENTS 10,511,690 B1 * 12/2019 Chatterjee ............. H04L 41/149
11,010,640 B1 * 5/2021 Daniels ................ G06V 10/454
(Continued)

FOREIGN PATENT DOCUMENTS

JP 2022501880 A 1/2022
WO 2023/014255 A1 2/2023

OTHER PUBLICATIONS

International Search Report and Written Opinion for International Application No. PCT/US2024/022575 mailed Jul. 3, 2024.
(Continued)

*Primary Examiner* — Padma Mundur
(74) *Attorney, Agent, or Firm* — Holland & Hart LLP

(57) ABSTRACT

A machine learning-based proxy model may generate measurements of quality of user experience in a vehicle-based communication network in the absence of direct feedback from the users regarding the user experience. Once generated, the proxy model may be applied to observed operational parameters of the on-board network to quantify the user experience for any user in any given instance. User experience measurements (e.g., trends identified therein) may be utilized to identify and implement adjustments to hardware, firmware, software, and/or service procedures associated with implementation of the on-board network. These adjustments may be implemented between transits of the vehicle, or in some cases, during transit of the vehicle to improve the user experience over the duration of use of the vehicle-based communication network.

25 Claims, 6 Drawing Sheets

(51) Int. Cl.
*H04L 41/5009* (2022.01)
*H04L 67/12* (2022.01)

(56) References Cited

U.S. PATENT DOCUMENTS

| | | | |
|---|---|---|---|
| 12,021,691 B1 * | 6/2024 | Mermoud | ............. H04L 67/306 |
| 2020/0107081 A1 * | 4/2020 | Tirella | .............. H04B 7/18508 |
| 2020/0314614 A1 * | 10/2020 | Moustafa | ............ H04W 12/069 |

OTHER PUBLICATIONS

Ma et al., Deep reinforcement learning-based edge caching and multi-link cooperative communication in internet-of-vehicles, 17th International Conference on Mobility, Sensing and Networking (2021).

* cited by examiner

400

402

TRAIN PROXY MODEL TO DETERMINE
MEASUREMENTS OF USER EXPERIENCE IN
VEHICLE-BASED COMMUNICATION NETWORK

404

RECEIVED OPERATIONAL PARAMETER VALUES
FOR USER

406

GENERATE MEASUREMENT OF USER EXPERIENCE
FOR USER

440

442

RECEIVE FIRST OBSERVED SET OF OPERATIONAL
PARAMETER VALUES FOR USER

444

ANALYZE VALUES USING TRAINED PROXY MODEL
TO GENERATE MEASUREMENT OF USER
EXPERIENCE FOR USER

446

CAUSE ADJUSTMENT(S) TO VEHICLE-BASED
COMMUNICATION NETWORK

SYSTEMS AND METHODS FOR APPLYING A PROXY MODEL OF NETWORK QUALITY TO ADJUST NETWORK HARDWARE OR SOFTWARE

CROSS-REFERENCE TO RELATED APPLICATIONS

This application claims priority to, and the benefit of the filing date of, U.S. Provisional Patent Application No. 63/493,983, filed Apr. 3, 2023 and entitled "Systems and Methods for Applying a Proxy Model of Network Quality to Adjust Network Hardware or Software," the entirety of the disclosure of which is incorporated by reference herein.

FIELD

The present disclosure relates to communication systems, and more particularly, to techniques for determining network quality experienced by user devices over a duration of time in a communication network and implementing adjustments to a communication/system network based upon the determined quality.

BACKGROUND

Vehicles, including but not limited to aircraft, may establish one or more satellite-based and/or terrestrial communication links to receive information to, and/or transmit information from the vehicle. A vehicle-based communication system is typically enabled via various communication components aboard the vehicle, including for example one or more aircraft-mounted antennas and further components which may be implemented, for example, as a Line Replaceable Unit (LRU) on-board the vehicle. Operation of the vehicle-based communication system enables an on-board communication network which may, for example, allow devices of passengers to receive live media content (e.g., web browsing, sporting events, live news) at the passenger electronic devices, or enable live bidirectional communications to and from the passenger devices (e.g., internet browsing, cellular calling, etc.) using the on-board communication network. Additionally or alternatively, such communications links may enable the vehicle to communicate with the ground to support the necessary operations of vehicle instruments and/or crew (e.g., aircraft navigation systems or crew communications).

A fundamental goal for any vehicle-based communication system is to operate to the satisfaction of users of the system, i.e., to provide a satisfactory on-board network experience from the perspective of the users over a duration of use of the network (e.g., over a flight in an aircraft). Various technological factors may affect the provision of a satisfactory network experience by a communication system provider. These factors may include, for example, the availability and/or performance of components of the communication system by which the network is provided, and/or the resilience of software/hardware/firmware elements to mitigate or account for issues encountered in real-time. Other technological limitations of the communication system may also play a role in user experience, such limitations not always being under the control of the provider of the on-board system. Such limitations may include for example limited bandwidth of an air-to-ground (ATG) or satellite link (and/or of the greater communication network relied upon by the on-board network, e.g., for cell towers in a greater ATG network), or latency associated with components in the greater communication network. Moreover, regardless of the level of technological resources available, and even when the system provider operates an on-board network in a manner that the system provider believes to provide a best possible experience to users (e.g., by considering tradeoffs of application/feature availability, bandwidth, latency, etc., such that the network performs "well" from the perspective of the system provider), the service parameters considered the system provider may not match the service parameters that a given user(s) most strongly correlates to their own assessment of user experience.

In consideration of these factors and limitations, vehicle communication system providers have sought models for evaluate the satisfaction of users with the network experience provided to the users (or "user experience") during any given transit, or across multiple transits. Models established by vehicle communication system providers to evaluate user experience in typically rely upon direct, explicit feedback from the users, e.g., to rate their own experience and/or identify particular factors observed to affect their own experience. To that end, system providers may provide users with surveys, e.g., delivered to respective devices of users during or immediately upon the conclusion of use of the on-board network. The present disclosure identifies, though, that feedback rate for user surveys is often low, or nonexistent for certain types of transit routes and service. Moreover, survey-based feedback, even when received, may not particularly identify the factors positively and/or negatively affecting the user experience. Accordingly, it may be difficult to configure and/or adapt the on-board network to more appropriately suit the needs and preferences of the users therein.

SUMMARY

The present disclosure describes systems and methods for generating and applying a proxy model to evaluate user experience in a vehicle-based communication network, to be used in the absence of direct feedback from network users. The proxy model, operating as a proxy for the direct user feedback, may identify and model the relationship(s) between user experience and each of a plurality of parameters associated with operation of the on-board communication network.

These operational parameters can include, for example, identifications and/or characteristics of hardware components included in the vehicle-based communication system (e.g., identification of an on-board LRU, or age of the LRU). Additionally or alternatively, operational parameters may include parameters associated with state of the on-board network and/or of a greater communication network in which the on-board network operates (e.g., the amount of time of the vehicle in coverage or out of coverage of the greater communication network, or a total transmit power available to one or more cell towers in an ATG network via which the vehicle may communicate). Still additionally or alternatively, operational parameters for the proxy model may include behavioral parameters indicating behavior the user(s) using the on-board network (e.g., use of particular websites, applications, data consumption rates, etc.). Still yet additionally or alternatively, in some embodiments, operational parameters for the proxy model can include service parameters associated with provision of on-board network access to the user(s) (e.g., usage of the network with respect to limitations of an access agreement between the service provider and the respective user(s)).

The present disclosure will describe various techniques for generating the proxy model. Generally speaking, generating the proxy model may involve machine learning techniques, e.g., supervised and/or unsupervised machine learning using at least the above-described operational parameters as inputs. For example, in some embodiments, a data set including operational parameters in observed cases is provided as input to an unsupervised clustering algorithm to generate a number of clusters which correspond to respective quantifications of user experience (e.g., a k-means clustering algorithm can create a number of clusters k, for example corresponding to integers on a scale of 0-10 scoring the user experience). As another example, in some embodiments, a training data set including observed operational parameters and recorded user experience scores from the same observed cases is provided as input for an artificial neural network which may be trained based upon the training data to score user experience (e.g., to provide a score on the 0-10 integer scale as output). Still other supervised and/or unsupervised machine learning techniques may be employed to generate the proxy model, including combinations thereof, in various embodiments.

Once the proxy model has been generated (e.g., once the machine learning model(s) have been trained), the proxy model can be applied to quantify user experience on the part of any user for any particular transit or portion thereof (e.g., part or all of the user's use of an in-flight communication network using one or more devices). In embodiments, the on-board communication system provider (and/or providers of individual hardware, services and/or applications therein) can utilize user experience values and/or trends identified therein to identify and implement improvements to hardware, firmware, software, and/or procedures for providing access to the on-board communication network. Thus, the generating and applying of the proxy model may enable an on-board communication system provider to quantify and utilize determinations of user experience of the on-board network, even without access to direct feedback on the part of users.

In an embodiment, a computer-implemented method is provided, the method being performed via one or more processors. The computer-implemented method may include (1) obtaining a first observed set of values of operational parameter corresponding to use of a vehicle-based communication network of a vehicle by a first user during a first transit of the vehicle, (2) via a trained proxy model, analyzing the first observed set of operational parameter values to generate a first measurement of quality of user experience in the vehicle-based communication network for the first user, and/or (3) based upon the first measurement of quality of user experience, causing one or more adjustments to the vehicle-based communication network to improve quality of subsequent usage of the vehicle-based communication network by the first user or by one or more further users. The method may include additional, fewer, or alternate actions, including those described herein.

In another embodiment, one or more non-transitory computer-readable media are provided. The one or more non-transitory computer readable media store non-transitory computer executable instructions that, when executed via the one or more processors of one or more computing devices, cause the one or more computing devices to (1) obtain a first observed set of values of operational parameter corresponding to use of a vehicle-based communication network of a vehicle by a first user during a first transit of the vehicle, (2) via a trained proxy model, analyze the first observed set of operational parameter values to generate a first measurement of quality of user experience in the vehicle-based communication network for the first user, and/or (3) based upon the first measurement of quality of user experience, cause one or more adjustments to the vehicle-based communication network to improve quality of subsequent usage of the vehicle-based communication network by the first user or by one or more further users. The one or more non-transitory computer-readable media may include additional, fewer, or alternate instructions, including those described herein.

In still another embodiment, a computing system is provided. The computing system may include one or more processors, and one or more memories storing instructions that, when executed via the one or more processors, cause the computing system to (1) obtain a first observed set of values of operational parameter corresponding to use of a vehicle-based communication network of a vehicle by a first user during a first transit of the vehicle, (2) via a trained proxy model, analyze the first observed set of operational parameter values to generate a first measurement of quality of user experience in the vehicle-based communication network for the first user, and/or (3) based upon the first measurement of quality of user experience, cause one or more adjustments to the vehicle-based communication network to improve quality of subsequent usage of the vehicle-based communication network by the first user or by one or more further users. The computing system may include additional, fewer, or alternate computing elements and/or instructions, including those described herein.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Although examples provided herein will describe an example aircraft-based network environment, it should be appreciated that the systems and methods herein may be applied to other types of vehicles in which an on-board communication network is provided (e.g., trains, boats, buses, etc.). Moreover, in still other embodiments, at least some of the techniques herein may be applied to communication networks other than vehicle-based communication networks, including for example various other visitor-based communication networks (e.g., networks situated in stationary environments such businesses, homes, event spaces, transit hubs, etc.).

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Example Communication System

Figure 1:
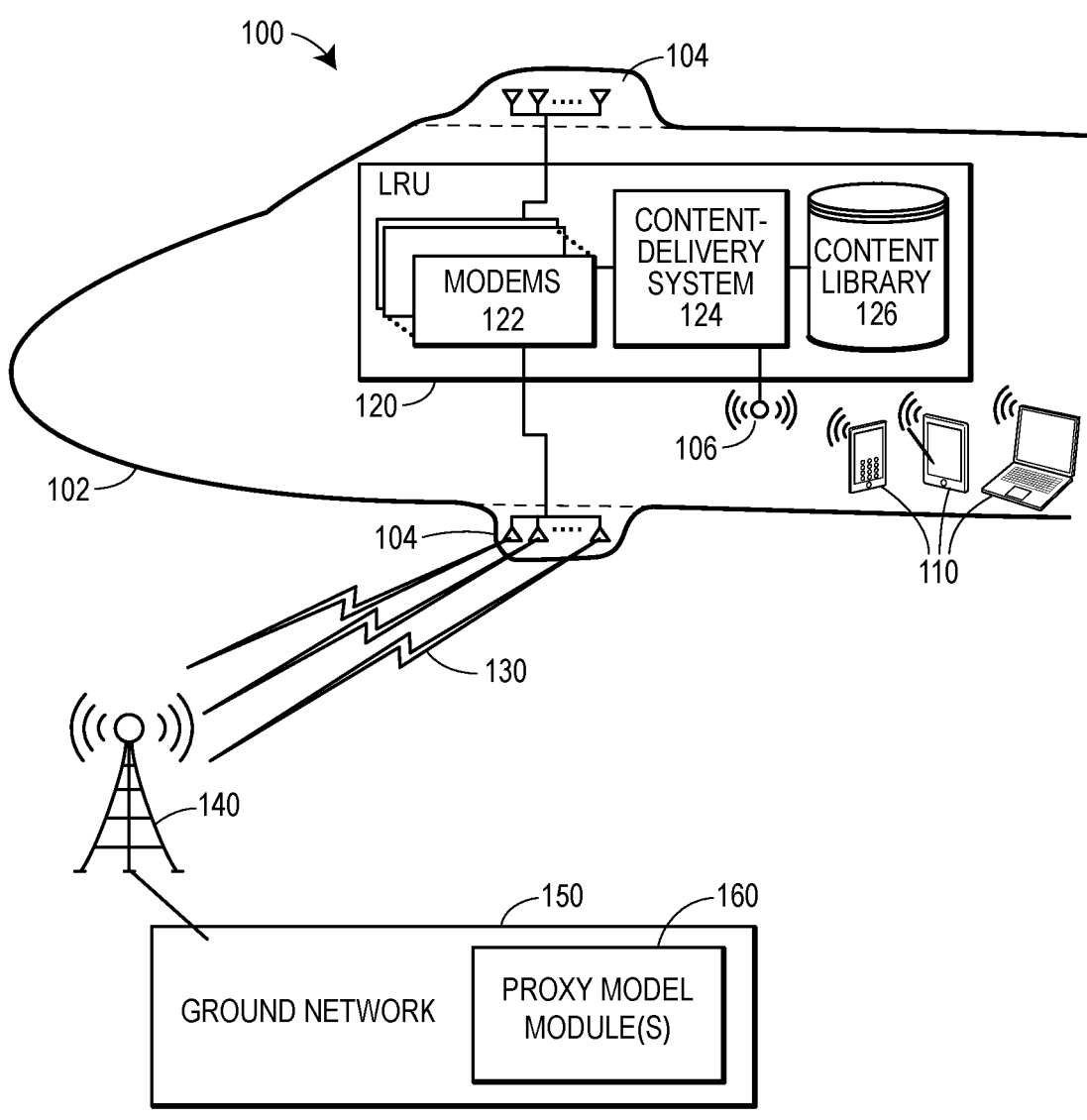
FIG. 1 illustrates an example computing environment in which the techniques described herein may be implemented, in accordance with some embodiments.

FIG. 1 illustrates an example communication system 100 via which techniques of the present disclosure may be implemented. The communication system 100 includes an aircraft 102 having one or more antennas 104 mounted to the aircraft 102. In the embodiment illustrated in FIG. 1, one antenna 104 is mounted to the belly of the aircraft 102 (e.g., to implement one or more air-to-ground (ATG) networks, for example over the S-band, cellular/LTE bands, etc.). One antenna 104 is mounted to the top of the fuselage of the aircraft 102 (e.g., to implement one or more satellite-based networks, for example over the $K_u$-band, $K_a$-band, L-band, S-band, etc.). Additional or fewer antennas 104 are possible, in various embodiments. Although the aircraft 102 will be described with respect to FIG. 1, other types of vehicles may be envisioned in various embodiments (e.g., personal automobile, bus, train, boat, helicopter, emergency vehicle, etc.).

The communication system 100 uses the antenna(s) 104 and other on-board network equipment to provide an on-board communication network 106 (i.e., one or more communication networks) within the cabin of the aircraft 102 (e.g., a Wi-Fi network, a cellular network, Bluetooth®, one or more wired networks, etc.). The communication network 106 enables personal electronic devices 110 of occupants on-board the aircraft 102 to send and receive data, e.g., to browse the Internet or to consume media content (e.g., movies, television, news broadcasts, and/or other media that may be stored locally at the aircraft 102 and/or transmitted from the ground). While not shown in FIG. 1 for clarity of illustration, the aircraft 102 may include electronics systems such as avionics systems (or equivalents for non-aircraft vehicles), such as communication systems, navigation systems, instrumentation, flight-control systems, or collision avoidance systems, any one or more of which may additional utilize the communication network 106 to send communications to and/or receive communications from the ground.

As many of the electronics systems of the aircraft 102 may require a degree of stability and/or secure attachment during transportation, at least some of the other on-board network equipment of the aircraft 102 may be included in a line replaceable unit (LRU) 120 that is fixedly or rigidly attached to the aircraft 102. The LRU 120 may be comprised of modular components that may be sealed units of an aircraft, which are designed to be replaced efficiently without using specialized tools enabling the aircraft 102 to quickly return to service, while LRU 120 is being tested and repaired. Typically, the LRU 120 is an electronic assembly that performs a specific function in the aircraft 102 and may be removed or replaced as a unit and serviced at a vehicle maintenance center. Some of the electronics systems of the aircraft 102 may not be included in the LRU 120. For example, instead of being fixedly connected to the aircraft 102 via the LRU 120, some electronics systems may be fixedly connected to the aircraft 102 using some other means, such as a bracket or other connecting device. In any case, the other on-board network equipment of the aircraft 102 includes one or more modems 122, a content-delivery system 124, and a content library 126.

The one or more modems 122 may be configured to be compatible with a plurality of different communication standards utilized by one or more ATG communication links 130, and/or one or more satellite communication links. The one or more ATG communication links 130 may utilize communication protocols associated with terrestrial communications (e.g., TDMA, GSM, CDMA, LTE, WiMAX, Wi-Fi, 4G, 5G, etc.) and/or associated with frequencies in the $K_a$ band, the $K_u$ band, the L band, and/or any other suitable wireless communication frequency bands. Each of the one or more modems 122 may be connected (wired or wirelessly) to at least one respective antenna 104 (e.g., via connection of a Tx port of a modem 122 to an Rx port of an antenna 104, and/or via connection of an Rx port of a modem 122 to an Tx port of an antenna 104). The communication links 130 may utilize communication protocols associated with terrestrial communications (e.g., TDMA, GSM, CDMA, LTE, WiMAX, Wi-Fi, 4G, 5G, etc.) and/or associated with frequencies in the $K_a$ band, the $K_u$ band, the L band, and/or any other suitable wireless communication frequency bands.

Each of the modems 122 may operate over one or more frequency bands, and the aircraft 102 may utilize the modems 122 to receive data or to transmit data from the aircraft 102. For example, the aircraft 102 may include thereon one modem of the modems 122 tuned to a frequency band that is allocated for direct communications between the aircraft 102 and ground stations, or on which a direct air-to-ground (ATG) communication link is supported (e.g., 849-851 MHz and 894-896 MHz). The aircraft 102 may additionally or alternatively include thereon one modem of the modems 122 tuned to a frequency band that is allocated for satellite communications such as the L band (40 to 60 GHz or 1 to 2 GHZ), the $K_u$ band (12-18 GHZ), the $K_a$ band (26.5-40 GHZ), and/or other spectrum that is allocated for satellite communications. Furthermore, each of the modems 122 may operate in accordance with certain communication protocols. For example, at least one of the modems 122 may operate in accordance with a 4G communication protocol and at least one of the modems 122 may operate in accordance with a 5G communication protocol. The ATG communications link(s) 130 (and/or one or more satellite-based communication links) may connect the aircraft 102 to one or more terrestrial base stations 140, which may in turn be connected to a ground network 150. The ground network may comprise various elements, including for example one or more data centers providing ground-based service to elements of the communication system 100, and/or various sources and/or destinations of content transmitted to or received from the aircraft 102 (e.g., the Internet). In particular, the ground network 150 may include one or more proxy model modules 160, which may be configured to perform at least a portion of the techniques of the proxy model of the present disclosure (e.g., generating a proxy model based upon in-flight data and other operational parameters obtained from one or multiple aircraft 102, and/or applying a proxy model to subsequent operation of the network 106).

Returning to the LRU 120, the content-delivery system 124 is configured to, among other things, deliver content from the content library 126 to the electronic devices 110 via the communication network 106. The electronic devices 110 may include mobile computing devices of passengers and crew, e.g. smartphones, tablets, laptop computers, personal digital assistants, e-readers, smart glasses, smart watches, and/or any other mobile computing device capable of wireless communications. In embodiments, the electronic devices 110 may include seatback-mounted units configured to provide content to users at respective seats of the aircraft 102. The electronic devices 110 may initiate requests, in response to user input, for example, for content. The content-delivery system 124 may deliver content to the electronic devices 110 regardless of its connection to an external network, such as the Internet 160. The content-delivery system 124 may be configured to provide an interface to the electronic devices 110 via the communication network 106 to view a list of content, select content, view content, download content, or purchase content or access to content, such as via the Internet 160 or the content library 126. The content-delivery system 124 may communicate with the electronic devices 110, for example, via one or more wired access points and/or wireless access points (WAPs) placed around the cabin of the aircraft 102. The communication network 106 may include additional networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHZ band) to facilitate communication.

The content provided via the content-delivery system 124 may be presented at a user interface of one or more of the electronic devices 110, in response to, for example, one or more requests from the one or more electronic devices 110 to deliver the content to the one or more electronic devices 110. Some examples of media content include movies, television shows, songs, video games, digital magazines, news feeds, web data, applications, messages, or any other content involving textual, audio and/or visual presentation. Content may also include software, configuration data, files, etc. that may be installed in, applied to, made available (e.g., as a file server) via the aircraft 102 or a system of the aircraft 102 (e.g., the LRU 120) by, for example, maintenance personnel. In particular, software content provided by the content-delivery system 124 to one or more electronic devices 110 can include an antenna installation assistant application (and/or data or functionalities associated therewith) provided to one or more electronic devices 110 of operator or maintenance personnel associated with the aircraft 102.

The proxy model module(s) 160, generally speaking, may comprise hardware and/or software elements configured to generate and/or apply a proxy model for evaluating user experience of the network 106 of the aircraft 102 or, more generally, respective on-board communication networks in each of a plurality of vehicles (e.g., a fleet of vehicles operated by the communication system provider). Generating and applying the proxy model, at a high level, may involve the proxy model module(s) 160 accessing and analyzing various operational parameters associated with the communication system 100 and the operation thereof, e.g., identification of components included in the system 100, operational data for the LRU 120, and/or network traffic information associated with usage of the electronic devices 110 in the on-board network 106. The proxy model module(s) 160 on the ground may obtain such operational parameters, for example, via the ATG link 130 and/or satellite link(s) implemented via the aircraft 102 while the aircraft 102 is in-flight or after the aircraft 102 has completed a given flight. Additionally or alternatively, in some embodiments, the proxy model module(s) 160 may receive a physical storage medium indicating operational parameters associated with the system 100, for example by transferring or copying one or more physical storage media from the LRU 120 to the proxy model module(s) 160.

In some embodiments, additionally or alternatively to implementation within the ground network 150, portions of the proxy model module(s) 160 may be implemented within the aircraft 102 itself (e.g., within the LRU). For example, in some embodiments, the proxy model module(s) 160 within the LRU 120 may be configured to generate or re-generate (e.g., re-train) the proxy model on-board based upon live operational parameters obtained during operation of the on-board network 106 (e.g., during or immediately before/after transit of the aircraft 102). As another example, in some embodiments, the proxy model module(s) 160 within the LRU 120 are configured to receive instructions for a proxy model generated within the ground network 150, and subsequently apply the proxy model in real-time to operational parameters for any particular transit of the aircraft 102. Generally speaking, though, generating the proxy model on the ground (i.e., within the ground network 150) may carry some advantages over generating the proxy model on-board the aircraft 102. For example, the ground network 150 may have access to a larger pool of computing resources (e.g., processing power), easier access to operational parameters for a plurality of aircraft 102 rather than just one aircraft 102, and closer proximity to human personnel trained to facilitate the generating/applying of the proxy model.

Example Operational Parameters Associated with an on-Board Network

A vehicle-based communication system (e.g., system 100 from FIG. 1) may supply various operational parameters to potentially be used as the basis of the proxy model for evaluating user experience in the on-board network. These operational parameters may include discrete variables, continuous variables, and/or categorical variables. Numerous examples of these operational parameters will be provided below, the parameters spanning categories including at least (1) system hardware component parameters, (2) network state parameters, (3) user behavior parameters, and/or (4) service parameters.

Although the present disclosure proposes that certain ones of the parameters discussed herein may have a particular effect on user experience, it should be appreciated that an objective of the present disclosure is to utilize a proxy model to determine if, and how much, any given operational parameter of the system/network tends to positively or negatively affect user experience in the on-board network. For example, while it might be proposed that loss of ATG network coverage may negatively affect a user's experience by the user not being able to send/receive content from the Internet, the training of the proxy model may reveal that negative impact to user experience is eliminated or at least mitigated for some users if the user was only using the network for on-board, locally stored content before the loss of coverage, if the user sent/received less than a threshold amount of data to/from the ground, and/or if the user had previously only used ground-based communications for services with viable alternatives provided locally on-board the vehicle.

Turning to the first category of operational parameters proposed above, system hardware component parameters include various identifiers and/or characteristics of hardware elements of the vehicle-based communication system. These hardware elements include, for example, one or more on-board units implementing the on-board network in the cabin of the vehicle (e.g., LRU(s) 120 of FIG. 1). These system elements can also include other on-board hardware in the communication pathway from the LRU(s) to user devices (e.g., wireless access points, installed seatback units, etc.), and/or hardware in the communication pathway between the LRU(s) to the antenna(s) (up to and including the antennas themselves).

In particular, system hardware component parameters may include an identifier of one or more LRUs in the vehicle. Different LRUs, which may be manufactured by same or different system providers, may provide varying capabilities and functionalities. For example, different LRUs may have support different (or additional) communication protocols, a higher/lower bandwidth, a higher/lower maximum number of simultaneously supported user devices, different supported applications, and/or different effective service altitudes. Accordingly, the identifier of the LRU itself may at least indirectly various operational parameters for a given transit, such as the communication protocol(s) used to support a user's use of the on-board network, the number of devices that were simultaneously using the network, and/or what application(s) the user may have been using in the on-board network (e.g., voice, text, web browsing, video streaming, audio streaming, email, VPN, etc.). Still additional (or alternative) inherent differences in LRU configuration and functionality are possible, including for example the configured ground-based support capabilities, system failure prevention or response protocols (e.g., power cycling), or service customization capabilities. Moreover, while the above differences in capability/functionality exist even when the different LRUs are each operating properly, actual operation of different LRUs may reveal software bugs and/or hardware defects particular to each respective LRU. For example, one particular LRU may provide unexpected latency under particular conditions or may inadvertently limit the number of devices that can be concurrently connected to the on-board network so as to potentially prevent additional users from utilizing the on-board network at all. In short, view of any of the above factors and/or additional factors not considered above, different LRUs may generally prove to provide different quality levels of user experience to users of on-board networks.

Still other aspects of on-board hardware may be included among operational parameters provided to the proxy model. These parameters can include, for example, the age of the vehicle and/or particular components aboard the vehicle, or an indication of a last time of maintenance of the vehicle and/or a particular component(s) thereof.

Moving to the second category of operational parameters set forth above, the quality of user experience may be affected by numerous characteristics or states of the on-board network and/or larger communication network supporting the on-board network. First and potentially foremost, an amount of time spent outside of a coverage zone of the communication system provider may affect user experience. For example, a communication system provider may operate in only a select set of countries, states, provinces, etc., and thus, provision of ground-based content to the vehicle may not be possible when the vehicle is outside of the coverage zone. "Dead" zones may also exist in regions where the (e.g., in an ATG network, areas not in a sight line of any terrestrial base stations). In these circumstances, the user may not have access to ground-based communications, and thus may be limited to using the on-board network for services/content locally at the vehicle (e.g., consuming locally stored video/audio content). Operational parameters may include a total amount or percentage of time spent by the vehicle outside of a coverage zone or outside of an optimal coverage zone over the course of a transit of the vehicle.

Operational parameters potentially affecting the user experience may include various aspects of the vehicle-based network as a whole. For example, user experience may be affected by a maximum quantity of on-board devices using wired and/or wireless services of the on-board network over the course of a transit, an average quantity of devices using wired/wireless services of the on-board network over the transit, a total or average data throughput by user devices over the transit, a communication bandwidth available to on-board devices over the transit, a bandwidth available to a particular user's device over the transit, and/or an average, maximum, minimum, or standard deviation of data throughput speed available to a particular user's device of the transmit. Additionally or alternatively, operational parameters affecting a user's experience may include aspects of the greater communication network outside of the vehicle (e.g., including satellites, base stations, and the connections therewith). For example, operational parameters affecting user experience for a given vehicle may include indications of congestion of the greater communication network (e.g., average/maximum/minimum number of other vehicles within a same coverage area as the vehicle, particular communication sockets throttled or blocked to the vehicle during the transit, and/or amount of availability of the ground-based network over the transit, e.g., as determined based upon a number or proportion of successful "heartbeat" pings to the ground-based network over the transit).

Moving to a third category of operational parameters, operational parameters potentially affecting quality of user experience for a given user may include indicators of behavior of the user while using the on-board network. These parameters may, for example, include total data consumed by the user over the transit, comparison of the user's data usage to average or baseline users (e.g., indicating "high-usage users" using 20%, 30%, 50%, or 100% more than average users, or using a larger than normal number of different electronic devices concurrently), data used by the user for various individual services/applications (e.g., web browsing, text, call, video streaming, email, etc.), splits between wired and wireless data usage, and/or usage of background applications at the user's device(s).

Additionally or alternatively, operational parameters relating to behavior of the user may include behaviors indicative of potential errors or outages in the on-board network. For example, visits by the user to a network support page of the on-board service provider may indicate the user encountering issues mid-transit. To provide other examples, such operational parameters may include a number or frequency of page refreshes by the user, and/or a number of dropped browsing sessions, dropped calls, lost packets, failed SMS messages, etc. As still another example, a parameter may indicate support cases raised by the user during or shortly after the transit. In particular, relevant support cases may include support cases raised shortly after an initial installation, reinstallation, or modified configuration of hardware and/or software on-board the vehicle. Additionally, particularly relevant support cases may include support cases raised by the user referencing times at which the communication system provider determines that the on-board network was in fact operating nominally or optimally. Defining operational parameters relating to behavior of the user may, in some embodiments, include refining an initial set of obtained operational parameters by analyzing the initial operational parameters to determine whether behavior of the user indeed corresponds to errors/outages in the on-board network (or alternatively, corresponds to a cause originating from the user(s)).

Moving to a fourth category of operational parameters set forth above, operational parameters potentially relevant to user experience may include service parameters associated with provision of on-board network access to the user. Such service parameters may, for example, include an indication of whether the user is subscribed to particular individual services within the on-board network experience (e.g., subscribed to a particular data rate, data cap, on-board video/audio streaming service, ground-based video/audio streaming service, etc.). Similarly, service parameters may include a device limit for the user (e.g., indicating how many total devices or concurrent devices the user can connect to the on-board network over one particular transit). Service parameters may additionally or alternatively include an indication of frequency and/or total usage of on-board networks by the user (i.e., outside of a single given transit for which the user experience might be evaluated). Still additionally or alternatively, service parameters may include an indication of whether the vehicle has had communication services suspended or interrupted, e.g., due to maintenance of the vehicle, thus preventing usage of the vehicle including on-board network service for the vehicle.

Generally speaking, the observed values of the operational parameters (e.g., any combination of parameters above) may be provided as one or more inputs to one or more machine learning models, which may include supervised and/or unsupervised models, examples of which will be provided in the present disclosure. Different ones of these parameters, when applied to the one or more machine learning models described herein, may prove to be strongly correlated, weakly correlated, or not at all correlated to quality of user experience of the on-board network. Moreover, still different parameters may emerge as being correlated to quality of user experience, potentially including parameters directly or indirectly observable from the parameters described herein.

Example Machine Learning Techniques for Proxy Model

Generally speaking, the proxy model of the present disclosure for evaluating user experience in an on-board network can be a machine learning-based model, i.e., incorporating one or more machine learning techniques. Examples of machine learning techniques for generating and applying the proxy model will be provided herein. It should be appreciated, though, that additional and/or machine learning techniques may be applied, in various embodiments.

Techniques for generating the proxy model may utilize supervised and/or unsupervised machine learning. In supervised machine learning, a processing element (i.e., one or more processing elements) is provided with labeled training data comprising example inputs and their associated outputs, and may generally seek to discover logic that maps inputs to outputs such that, when subsequent novel inputs are provided to the trained machine learning model, the trained machine learning model accurately predicts the correct output (or at least increases the likelihood of correctly predicting the output). In unsupervised machine learning, the processing element may be required to find its own structure in unlabeled training data comprising example inputs without associated outputs.

Accordingly, in a supervised and/or an unsupervised machine learning model for evaluating user experience, training data provided to the machine learning model can include values of operational parameters associated with operation of a vehicle-based communication system/network, including for example any of the operational parameters discussed in the foregoing section. In an unsupervised machine learning model (e.g., a k-means clustering algorithm, which will be described in this section), the processing element may be provided with the operational parameter inputs without associated outputs (e.g., sets of operational parameter inputs for respective sessions in the on-board network, without corresponding user experience scores having been provided by the users themselves). The unsupervised model may be trained (i.e., generated) to identify structure in the input operational parameters, e.g., to determine logic, relationships, and/or trends among the input(s). In a supervised machine learning model, on the other hand (e.g., an artificial neural network), the processing element may be provided with operational parameter inputs with their associated outputs (e.g., sets of operational parameter inputs for respective sessions in the on-board network, with corresponding user experience scores having been provided by the users themselves, for example by survey responses). The supervised model may be trained to accurately predict a correct user experience score based on novel operational parameter inputs for novel sessions in the network (e.g., to predict an integer score on a scale of 0-10 representing increase satisfaction level in using the on-board network). Correctness of a generated supervised machine learning model may be validated and/or updated by testing the generated model against novel operational parameters having associated user experience score outputs, to thereby enable further refinement of the supervised model (e.g., to adapt the model to new network environments, different hardware, different user tendencies, service offering changes, etc.).

The techniques described herein may be applied at various levels of granularity with respect to vehicles and on-board networks managed by a vehicle-based communication system provider. For example, in some embodiments, the generating and applying of a machine learning model may be isolated to an on-board network of a single vehicle and, to the extent that the system operator may operate multiple vehicles, different proxy models (comprising different machine learning models) may be generated and applied for each respective vehicle. In some embodiments, a proxy model can be generated using aggregate data across each of a plurality of similar or comparable vehicles (and on-board systems/networks therein) operated by the communication system provider.

Example Neural Network for Evaluating User Experience

Figure 2A:
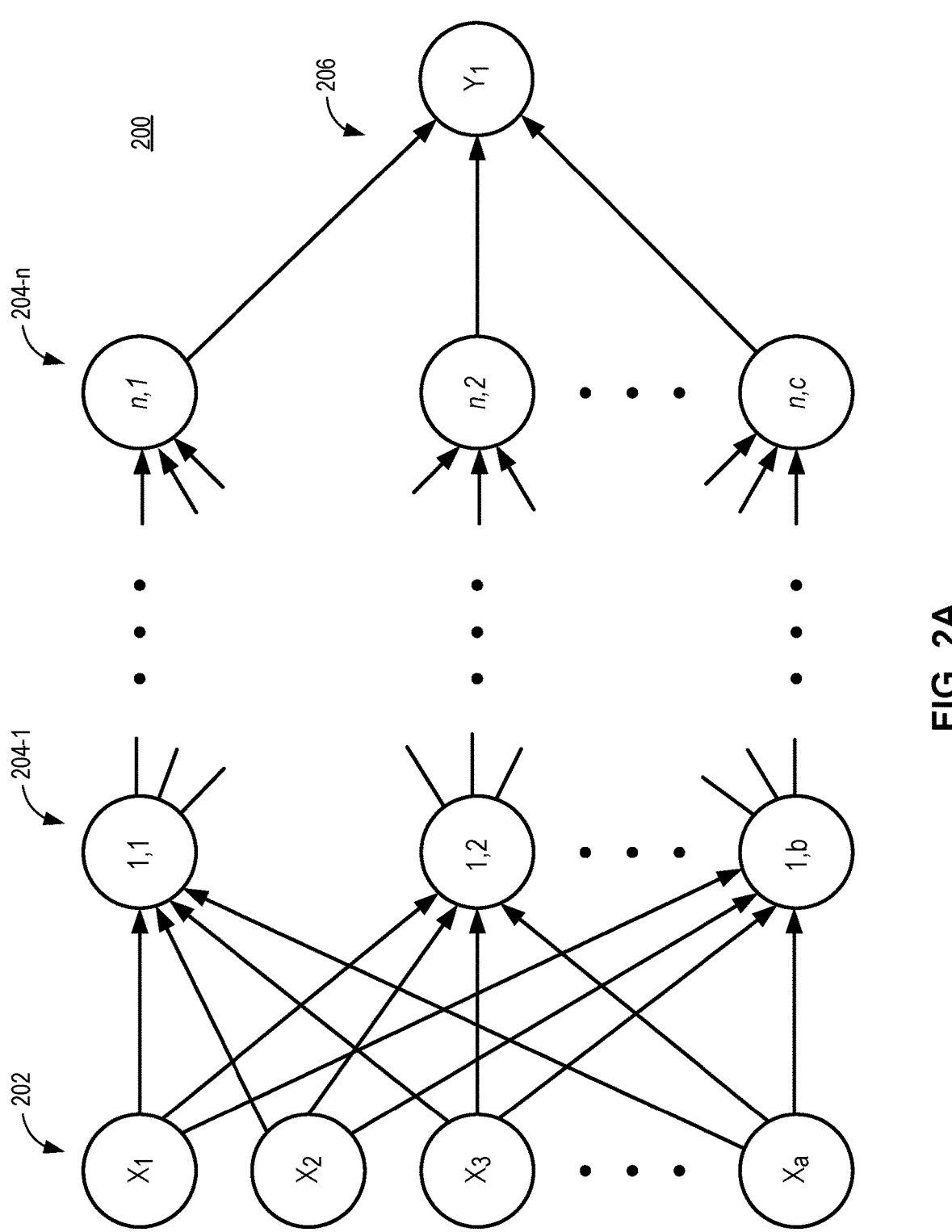
FIG. 2A illustrates elements of an example artificial neural network, in accordance with some embodiments.

FIG. 2A illustrates elements of an example artificial neural network 200, i.e., a supervised machine learning model that may be trained to evaluate user experience in an on-board communication network (e.g., to generate scores representative of quality of user experience or user satisfaction for any given user on any given transit). The neural network 200 may be trained, for example, via the proxy model module(s) 160 of FIG. 1, and/or other suitable computing devices of the present disclosure.

The neural network 200 includes a plurality of neurons arranged in a plurality of layers. The layers include an input layer 202, one or more intermediate or "hidden" layers 204-1 through 204-n, and an output layer 206. Respective inputs $x_1$ through $x_a$ in the input layer 202 may correspond to operational parameters associated with the provision of the on-board communication network (e.g., any of the operational parameters of the present disclosure, or combinations thereof). Inputs in the input layer may include discrete, continuous, and/or categorical parameters, in various embodiments.

Output $y_1$ in the output layer 206 may correspond to a representation of user experience or satisfaction for any particular user (e.g., passenger) for any particular transit or a portion thereof. The output may, for example, be a score on an integer scale from zero through ten, where zero represents a least satisfactory user experience and ten represents a most satisfactory user experience. Additional or alternative outputs may be possible, in embodiments. For example, rather than providing just one output indicative of a composite user experience score, the neural network 200 may provide several outputs indicating respective probabilities of each of several possible user experience scores for a given scenario. Still additionally or alternatively, outputs of the neural network 200 may include indication of actions that may be taken to address unsatisfactory user experience and/or replicate satisfactory user experience. Such action may include, for example, modifications to software, firmware, and/or hardware supporting the on-board network. Further examples of such action will be provided in subsequent portions of the present disclosure.

The number of hidden layers n may be any integer greater than or equal to 1. Each of the hidden layers 204-1 through 204-n may have same or different numbers of neurons, where b represents the number of neurons in the hidden layer 204-1 and c represents the number of neurons in the hidden layer 204-n. Numbers of neurons in each hidden layer may differ from the number of inputs in the input layer 202 and/or outputs in the output layer 206. Inputs to each neuron in each hidden layer may operate on one or more inputs from the input layer 202 and/or one or more outputs of other layers (e.g., a preceding intermediate layer). In some embodiments, an output of the neural network 200 may be obtained not just from the output layer 206, but from one or more of the intermediate layers 204-1 through 204-n. Various other configurations of the neural network 200 are possible.

Training of the neural network 200 may involve providing sets of operational parameters as inputs, each set of inputs corresponding to a use of (or "session" in) the on-board communication network for a particular transit (or "trip"). Each set of inputs may be labeled with the corresponding, real user experience score that functions as the "correct" output for the set of inputs. Accordingly, hidden layers 204-1 through 204-n may emerge and change as the training of the neural network 200 identifies relationships between inputs, outputs, and/or other neurons. The training of the neural network 200 conditions the neural network 200 to provide correct outputs based upon novel input data sets, e.g., to provide user experience scores that match (or are at least likely to match) scores explicitly provided by users regarding their on-board network experience (e.g., via survey data).

In some embodiments, the neural network 200 may be a recurrent neural network, where outputs from at least one layer of the neural network 200 are fed back to a previous layer(s) during training to provide an indication of significance of a particular input or intermediate layer output in determining a particular decision or calculation. Moreover, as a result of training, the number of inputs in the input layer 202 may change, for example as certain inputs are identified as being less significant to output of the neural network 200.

Figure 2B:
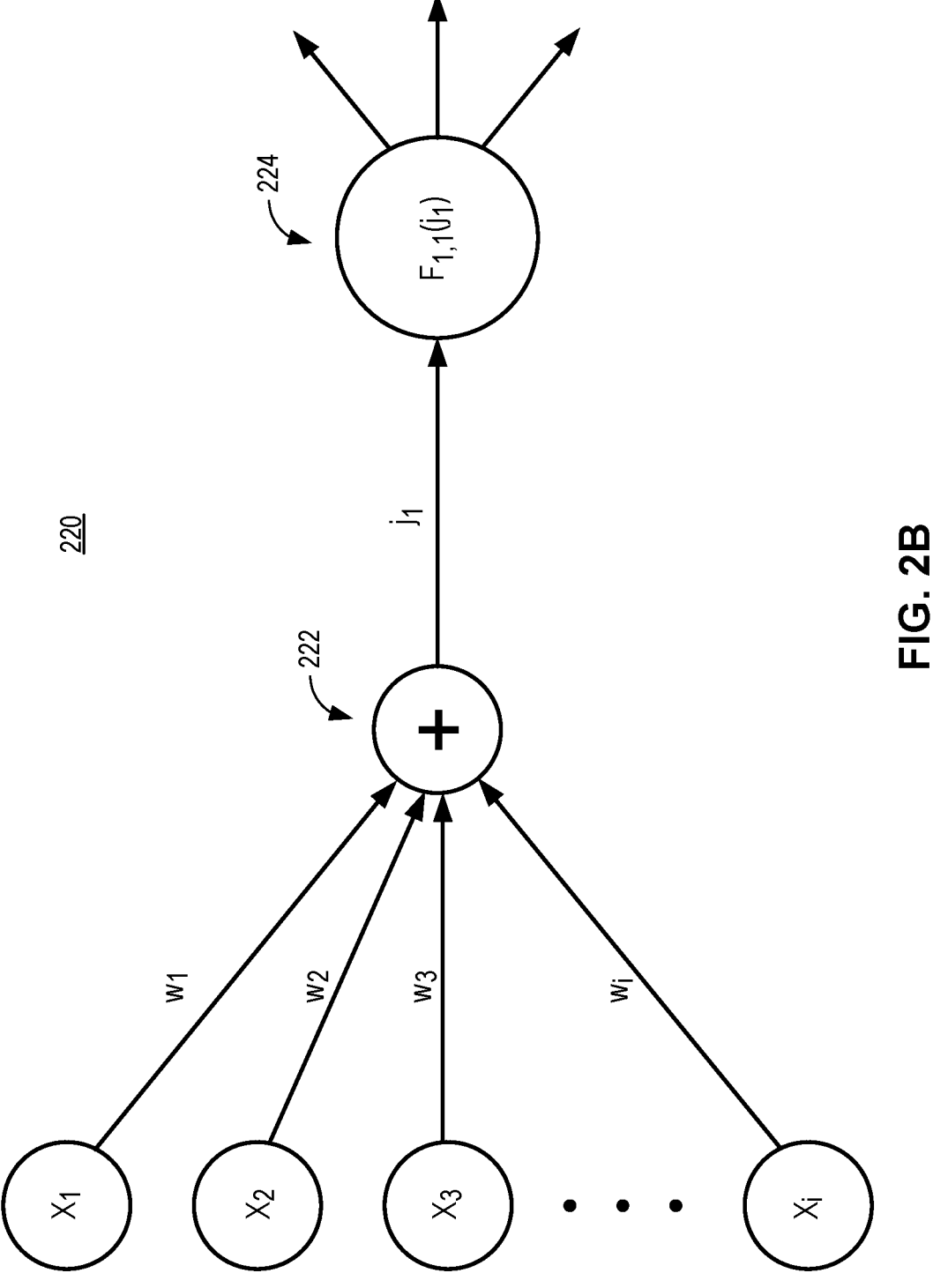
FIG. 2B illustrates elements of an example neuron in the artificial neural network of FIG. 2A, in accordance with some embodiments.

FIG. 2B illustrates an example neuron 220 that may correspond to a neuron in the neural network 200 of FIG. 2A. One or more inputs $x_1$ to $x_i$ are provided to the neuron 220. An input may be, for example, one of the inputs from the input layer 202 of the neural network 200, or an output of a neuron of another layer of the neural network 200 (e.g., a neuron of a hidden layer). Each input may be assigned a respective weight $w_1$ through $w_i$, and respective weights for each input may be determined and adjusted during the training of the neural network. Weights $w_1$ through $w_i$ may include same and/or different weights. A larger weight correspond to increased relevance of input to a decision or calculation of the neuron 220, whereas an input determined to be less significant or entirely irrelevant to the decision or calculation may be assigned a zero or near-zero weight. Weighted inputs $x_i$ through $x_n$ may be provided to a summing node 222 configured to provide a sum $j_1$ of the weighted inputs to a function 224. The function 224 operates upon the sum $j_1$ to produce one or more outputs, which include one or more ultimate outputs of the neural network and/or one or more values to be provided to another hidden layer neuron of the neural network 200.

Example K-Means Clustering for Evaluating User Experience

Additionally or alternatively to the neural network model, the proxy model for evaluating user experience in the on-board network can include a k-means clustering model, and/or other forms of clustering models and/or other unsupervised machine learning models.

Particularly, a proposed k-means clustering model generally seeks to categorize input points into a predefined number of similar clusters k, where each different one of the k clusters may correspond to a different level of quality of user experience using the on-board network. For example, the model may be defined to have three clusters under the notion that respective clusters may correspond to satisfactory, neutral, and unsatisfactory user experience. In a different embodiment, eleven clusters may be envisioned, under the notion that each of the clusters may correspond to a score of user experience on the integer scale of zero (worst user experience) to ten (best user experience).

Training input to the k-means clustering model includes a plurality of data points, where each data point may for example represent a use session of the on-board network by a respective user for a respective transit. Each respective data point may comprise values of one, two, three, four, five or more operational parameters measured or otherwise observed for the respective use session. Accordingly, the data space from which the clustering model is to identify the k clusters may be a one-dimensional data space, two-dimensional space, three-, four-, or five-dimensional data space, etc.

The training of the k-means clustering model comprises iteratively defining centers and boundaries of each of the plurality of clusters (numbering k) in the data space. Upon a first iteration, respective centroid or "mean" points are defined for each of the k clusters (e.g., by randomly generating the centroid points). Each respective one of the training input data points may then be associated with the cluster with the closest centroid. The k-means clustering algorithm then recalculates a new centroid for each cluster as the mean of each of the training input data points associated with the respective cluster. Each of the training input data points may then be re-associated with a cluster (i.e., a same or different cluster) based upon a determination of the closest one of the new k centroids. This iteration repeats until, upon any successive redefining of centroids and re-association of data points, the centroids and cluster memberships no longer change. The attempt to cluster the training input is thus complete, with each training input data point having been assigned to a respective one of the predefined number of clusters k.

In k-means clustering models, the assigning of data points to clusters is sensitive to locations of the initially defined centroids. In other words, if the k centroids were initially placed in different locations in the data space, the ultimate locations of the clusters and assignments of the data points may differ. For this reason, it is often advantageous to attempt the k-means clustering algorithm two, three, four, five, or more times, with each execution producing different sets of k clusters. From these attempts, the k-means clustering model can select a "best" clustering attempt, for example by selecting the clustering attempt with the least summed within-cluster variance among all of the k clusters (e.g., based upon least-squared distances between the data points and their respective centroids).

With the best clustering attempt selected, a final cluster is thereby assigned for each of the training input data points. The centroid of each final cluster may be the mean of its constituent data points and, for each respective final cluster, the boundaries of the respective cluster encompass all points in the data space for which the closest defined centroid is the centroid of the respective cluster. Thus, any novel data point thereafter can be associated with one of the final clusters defined by the k-means clustering model.

Notably, because the k-means model is unsupervised, the final defined clusters may not be inherently tied to any particular evaluation of quality of user experience. Rather, the respective clusters define similar types of user experiences based upon the parameters used for the inputs to the model. Further techniques may be necessary to assign a user experience value (e.g., score) to each cluster. In some embodiments, a human user evaluates the defined cluster and rates or ranks the defined clusters according to perceived quality of user experience (e.g., by assigning each cluster an integer score on a scale of zero to ten), e.g., based upon comparison to labeled operational parameters having corresponding user-provided user experience scores for other sessions. In some embodiments, labeled operational parameters having corresponding user-provided experience scores may be plotted on the trained k-means clustering model, and user experience scores for each respective cluster may be determined based upon the scores for the labeled data falling within each cluster (e.g., an average of the scores for the labeled data points for which the centroid of the respective cluster is the closest of the k centroids).

Additionally, or alternatively, in some embodiments, the artificial neural network described above can determine user experience values for each of the k clusters. For each respective cluster, the operational parameter values for the respective centroid (and/or of other points within the respective cluster) can be provided as novel input to the trained neural network model, and an output produced by the neural network (e.g., score from zero to ten) can be used as the user experience value for the respective cluster.

Other techniques of combining the k-means clustering model and the artificial neural network model may be envisioned. For example, in embodiments, the particular operational parameters used to define the data space for the k-means clustering model are selected based upon knowledge generated by the neural network model. That is, operational parameters determined by the neural network model to be highly relevant to user experience may be used to define the k-means clustering data space, whereas operational parameters determined to not be highly relevant to user experience may not be used to define the k-means clustering data space. Additionally or alternatively, in some embodiments, operational parameters used to define the k-means clustering data space include not just the original operational parameters described herein, but also one or more outputs generated by the neural network model (e.g., an output of a hidden layer of the neural network model 200 of FIG. 2A).

Still additional or alternative machine learning models may be used for the proxy model of the present disclosure. In some embodiments, the proxy model may include additional or alternative supervised machine learning models, such as a decision tree, a linear regression, a random forest algorithm, a Bayes classifier, a supervised clustering algorithm, etc. In some embodiments, the proxy model may include additional or alternative unsupervised machine learning models, such as a different clustering algorithm to that described above.

Applications of Model to Improve System/Network Implementations

According to the techniques of the present disclosure, a proxy model comprising one or more trained machine learning models facilitates a determination of quality of user experience for any given user for any given transit or portion thereof, in the absence of explicit feedback provided by the users themselves during or after the transit. The ability to evaluate user experience in this manner may enable a number of improvements to hardware, software, and/or firmware associated with the providing of the on-board network to users. These improvements can include those made to the on-board communication system/network to better serve subsequent user sessions. In some embodiments, improvements to the on-board system/network may be made while the vehicle is in-transit. This section of the present disclosure will provide some examples of such improvements, though it should be understood that additional and/or alternative techniques may be envisioned, in embodiments.

In embodiments, one or more computing devices of on-board or off-board the vehicle may be configured to apply the trained proxy model to compute user experience values for users during or after use sessions in the on-board network, analyzing the proxy model output to identify adjustments to the vehicle-based system/network based upon the proxy model output, and/or implement the identified adjustments to the on-board system/network (e.g., during the use session, and/or between use sessions of the on-board network, for example between transits or during maintenance downtime of the vehicle). For example, referring back to FIG. 1, the LRU 120 may store at least portions of the proxy model (or otherwise communicate with the proxy model in the ground network 150) and identify one or more adjustments to network/service parameters during a flight of the aircraft 102, to thereby attempt to improve the user experience of one or more measures based upon an evaluation of the user experience from a previous portion of the same flight. As another example, one or more computing devices operating as part of the ground network 150 may communicate with the aircraft 102 while the aircraft 102 is in-flight, to cause the LRU 120 to implement live modifications to network or service parameters. Combinations of the above implementations may be implemented, in embodiments. that is, the applying of the proxy model to evaluate user experience, analyzing of proxy model output to identify system/network adjustments, and/or implementing of such adjustments may combine computing elements on- and off-board the vehicle.

In some embodiments, identified adjustments to the vehicle-based system/network may include adjustments or replacements to one or more hardware elements of the system implementing the vehicle-based communication network. Although it is likely difficult or impossible to adjust or replace many of the hardware elements while the vehicle is in use and/or in-transit, certain system hardware elements of a vehicle may be marked for maintenance and/or replacement based upon user experience scores calculated by the proxy model for one or more users from one or more transits of the vehicle. More particularly, the system hardware elements of the vehicle may be identified based on particular operational parameters that factored into the user experience scores calculated by the proxy model. For example, if user experience in one or more sessions in the on-board network is affected negatively by drops in connection or communication pathway losses between vehicle hardware (e.g., antennas) and the ground-based network, one or more antennas of the vehicle can be identified to be replace and/or checked for correct wirings to other on-board hardware, cross modulation, physical damage, and/or other issues. As another example, if user experience in a plurality of sessions in the on-board network across one or more transits are repeatedly impacted by latency or reduced per-device bandwidth, an installed LRU of the vehicle may be replaced with a new LRU having greater communication throughput capability and/or locally stored content offerings to alleviate congestion in future uses of the on-board network. If negative user experiences are identified in one or more sessions that are not connected to vehicle-mounted hardware but rather to user devices themselves, the system provider may push one or more notifications to user devices to encourage remedial measures such as an application update, an operating system update, a replacement to the user device, and/or measures that may improve experience in subsequent use of the on-board network.

In some embodiments, identified adjustments to the vehicle-based system/network may include adjustments or replacements to one or software elements associated with implementation of the on-board network. For example, the on-board LRU may implement one or more updates or reversions to LRU system software, and/or implement updates/reversions to respective applications connected to any unsatisfactory user experiences in the on-board network. Additionally or alternatively, in embodiments, where unsatisfactory user experiences for one or more users are connected to use of a particular application (e.g., a video streaming application communicating with the ground), the LRU may push a notification to the one or more users encouraging the one or more users to switch to a comparable equivalent to the application(s) connected to the unsatisfactory experience (e.g., to encourage the users to switch to an application streaming locally-stored video content instead of streaming from the ground, as the former places less demand on the communication pathway between the vehicle and the ground.

In some embodiments, identified adjustments to the vehicle-based system/network can include adjustments to service parameters, policies, and/or protocols with the implementation of the on-board network. As an example, a provider of the on-board communication network may encourage, throttle, and/or block the use of particular services, applications, and/or websites (e.g., in favor of locally provided services) if it is determined that the on-board network is not capable of providing optimal experience to the particular services, applications, and/or websites. Conversely, if a service, application, or site has previously been blocked but would be demonstrated to improve user experience if available even at only a partial level of service, the network provider may unblock the service, application, or site to thereby improve user experience for subsequent users. As still another example of service-based adjustments, at least some alleviation of unsatisfactory user experience may be achieved through warning users (e.g., via push notifications) of impending events discovered to have a detrimental effect upon user experience (e.g., to warn users of upcoming loss in connection to the ground-based network, which may alleviate the inconvenience associated with attempting to access the ground-based network when the ground-based network is not available).

Still additional and/or alternative adjustments to a vehicle-based system/network are possible based upon information identified through application of the proxy model of the present disclosure. In various embodiments, human personnel may intervene to investigate and/or modify aspects of the on-board network in response to unsatisfactory user experiences being identified in one transit of one vehicle, across multiple transits of one vehicle, or across multiple transits of multiple vehicles.

In some embodiments, the proxy model of the present disclosure may be utilized to measure the positive or negative effects of one or more of the system/network adjustments identified above. That is, a plurality of user experience scores for respective users/sessions may be calculated before and after any given adjustment to the system/network, e.g., to identify positive change achieved via the adjustment and to replicate the adjustment across one or more additional vehicles/networks operated by the communication system provider.

Example Computing Device

Figure 3:
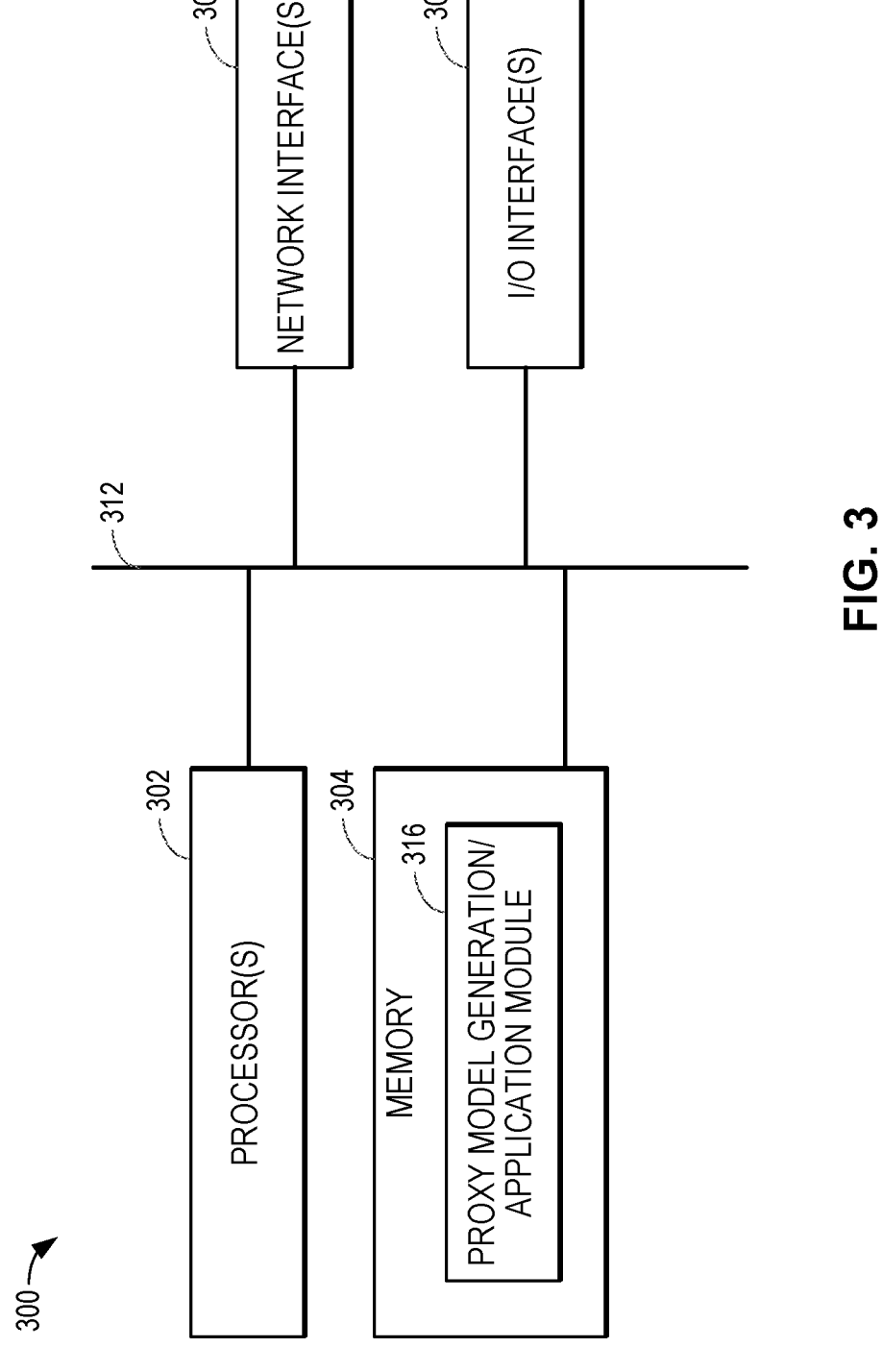
FIG. 3 illustrates a block diagram of an example computing device implementing techniques of the present disclosure, in accordance with some embodiments.

FIG. 3 illustrates an example computing device 300 that may implement techniques of the present disclosure, in some embodiments. The computing device 300 may, for example, be an on-board or off-board computing device (e.g., server) configured to generate and/or apply a proxy model for user experience (e.g., as part of a proxy model module 160 of FIG. 1).

The computing device 300 includes a processor 302 (i.e., one or more processors), such as a microprocessor, controller, and/or other suitable type of processor. The computing device 300 further includes a memory 304 (i.e., one or more computer memories), which may include volatile memory and/or non-volatile memory containing computer executable instructions accessible by the processor 302 to cause the computing device 300 to perform actions described herein. The computing device 300 further includes a network interface 306 (i.e., one or more network communication interfaces). In some embodiments, the computing device 300 includes an input/output (I/O) interface 308 (i.e., one or more input and/or output interfaces). The components of the computing device 300 are operatively coupled to each other via a computing bus 312.

The network interface 306 may, for example, enable the computing device 300 to communicate with one or more other devices, such as a base station, other elements of a ground network, and/or components of one or more vehicles The network interface 306 may include any suitable type of communication interface(s), such as wired interfaces and/or wireless interfaces configured to operate in accordance with any suitable communication protocol(s). Example network interfaces 306 include a TCP/IP interface, a Wi-Fi transceiver (e.g., according to the IEEE 802.11x family of standards), an Ethernet transceiver, a cellular network radio, a satellite network radio, or any other suitable interface based upon any other suitable communication protocols or standards. The I/O interface 308 may include, for example, a Bluetooth® interface, a near-filed communication (NFC) interface, a universal serial bus (USB) interface a serial interface, an infrared interface, etc., to enable receipt of user input (e.g., a touch screen, keyboard, mouse, touch pad, joystick, trackball, microphone, button, etc.) and communication of output data to the user (e.g., via a display, speaker, printer, etc.).

Returning to the memory 304, non-transitory portions of the memory 304 may include a proxy model generation/application module 316 (i.e., one or more modules), configured to generate and/or apply a proxy model for user experience in an on-board network according to techniques of the present disclosure. The module 316 may include non-transitory instructions executable via the processor 302 to cause the computing device 300 to perform the actions relating to generating/applying the proxy model.

The computing device 300 may include additional, fewer, and/or alternate components in various embodiments, including components described in this detailed description.

Example Computer-Implemented Method

Figure 4A:
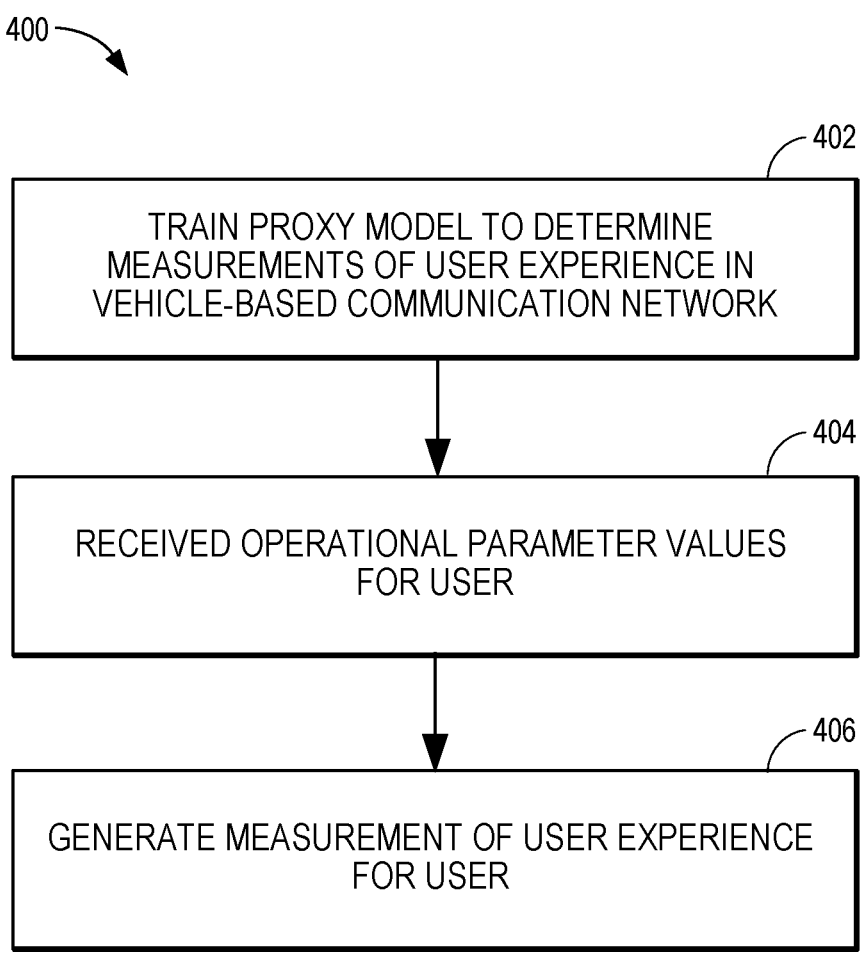
FIG. 4A illustrates an example computer-implemented method associated with generating a proxy model for user experience, in accordance with some embodiments.
Figure 4B:
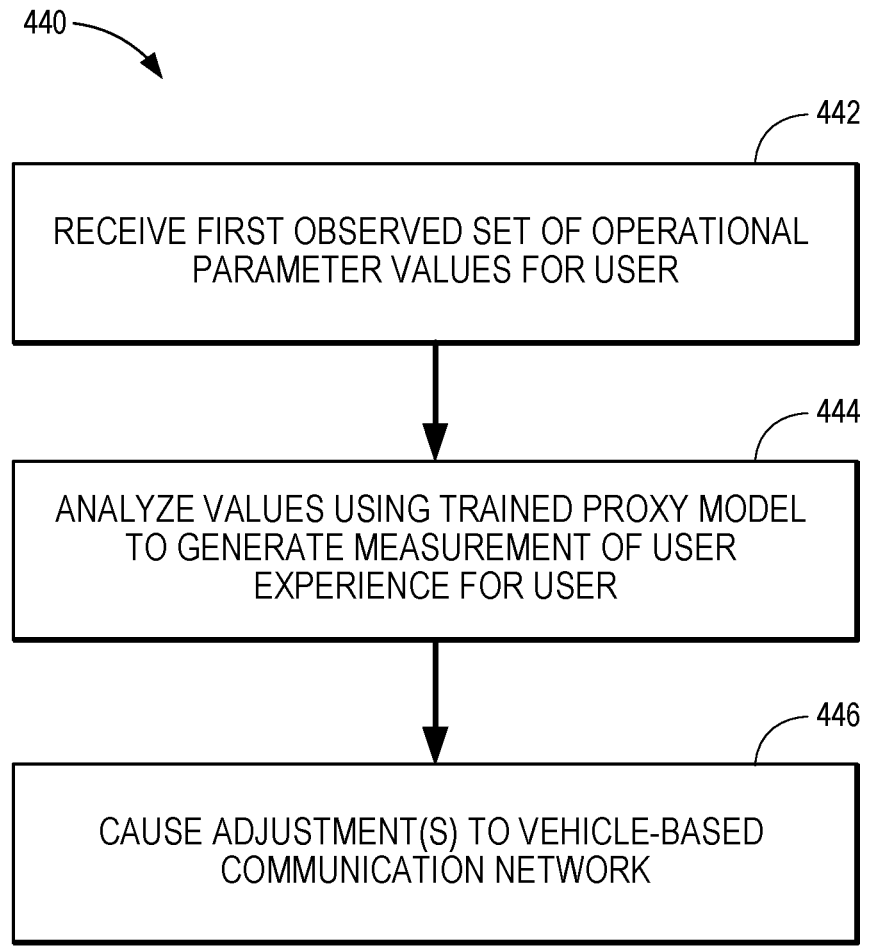
FIG. 4B illustrates an example computer-implemented method associated with applying a proxy model for user experience, in accordance with some embodiments.

FIGS. 4A and 4B respectively illustrate block diagrams of example computer-implemented methods 400 and 440, in accordance with some embodiments. The methods 400 and/or 440 may be implemented, for example, via components of the ground network 150 of FIG. 1 (e.g., of the proxy model module 160) and/or the computing device 300 of FIG. 3, according to execution of non-transitory instructions stored at one or more computer memories.

Beginning with FIG. 4A method 400 includes training a proxy model to analyze values of a plurality of operational parameters associated with providing a vehicle-based communication network of a vehicle (402). The training of the proxy model trains the proxy model to generate measurements of quality of user experience in the vehicle-based communication network. The training data may include training sets of operational parameter values associated with uses of the vehicle-based communication network by users, which in some embodiments may be labeled with user experience measurements (e.g., scores on a zero to ten integer scale) provided by respective users during or after use of the vehicle-based communication network. The proxy model may include a k-means clustering model, an artificial neural network, and/or another machine learning-based model(s) described in the present disclosure.

The method 400 further includes obtaining a first observed set of operational parameter values corresponding to use of the vehicle-based communication network by a first user during a first transit of the vehicle (404). The operational parameter values may include values of any of the operational parameters described in the present disclosure (e.g., hardware identification/configuration information, network status information, user behavior, etc.).

The method 400 still further includes analyzing the first observed set of operational parameters via the trained proxy model (406). The analyzing of the first observed set of operational parameters generates a first measurement of quality of user experience in the vehicle-based communication network for the first user in the vehicle (e.g., a score on the zero to ten integer scale).

Moving to FIG. 4B, the method 440 includes obtaining a first observed set of values of operational parameter corresponding to use of a vehicle-based communication network of a vehicle by a first user during a first transit of the vehicle (442). The operational parameter values may include values of any of the operational parameters described in the present disclosure (e.g., hardware identification/configuration information, network status information, user behavior, etc.).

The method 440 further includes analyzing the first observed set of operational parameters via a trained proxy model (444). The analyzing of the first observed set of operational parameters generates a first measurement of quality of user experience in the vehicle-based communication network for the first user in the vehicle (e.g., a score on the zero to ten integer scale). The proxy model may include a k-means clustering model, an artificial neural network, and/or another machine learning-based model(s) described in the present disclosure.

The method 440 still further includes, based upon the first measurement of quality of user experience, causing one or more adjustments to the vehicle-based communication network (446). The one or more adjustments to improve user experience in subsequent usage of the vehicle-based communication network by the first user or by one or more further users. The one or more adjustments may, for example, include (1) a replacement, maintenance, or reconfiguration of one or more hardware components in the vehicle-based communication network, (2) a replacement, update, reversion, or reconfiguration of one or more software elements in the vehicle-based communication network, (3) an adjustment to availability of one or more services, applications, or web sites via the vehicle-based communication network, and/or another one or more techniques described in the present disclosure.

It should be appreciated that each of the methods 400 and/or 440 may contain still additional, fewer, and/or alternate actions to those illustrated in FIGS. 4A and 4B, including any suitable actions described in this detailed description. Particularly, aspects of the methods 400 and 440 may be combined with each other, in various embodiments. Furthermore, the orders of actions in the methods 400 and/or 440 from those illustrated in the figures, in some embodiments.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

This detailed description is to be construed as examples and does not describe every possible embodiment, as describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

A1. A computer-implemented method implemented via one or more processors, the method comprising: training, based upon training data, a proxy model to analyze values of a plurality of operational parameters associated with providing a vehicle-based communication network of a vehicle to generate measurements of quality of user experience in the vehicle-based communication network, the training data comprising training sets of operational parameter values associated with uses of the vehicle-based communication network by users; obtaining a first observed set of operational parameter values corresponding to use of the vehicle-based communication network by a first user during a first transit of the vehicle; and/or analyzing, via the one or more trained proxy model, the first observed set of operational parameter values to generate a first measurement of quality of user experience in the vehicle-based communication network for the first user in the vehicle.

A2. The computer-implemented method of aspect A1, wherein the vehicle is an aircraft.

A3. The computer-implemented method of aspect A1 or A2, wherein the proxy model includes one or more unsupervised machine learning models.

A4. The computer-implemented method of aspect A3, wherein the one or more unsupervised machine learning models include one or more unsupervised clustering models.

A5. The computer-implemented method of aspect A4, wherein the one or more unsupervised clustering models include a k-means clustering model, wherein training the proxy model comprises training the k-means clustering model to categorize respective sets of operational parameters for respective users into one of a plurality of clusters associated with different levels of quality of user experience in the vehicle-based communication network.

A6. The computer-implemented method of any one of aspects A1 to A5, wherein the proxy model includes one or more supervised machine learning models.

A7. The computer-implemented method of aspect A6, wherein the one or more supervised machine learning models include one or more artificial neural networks, wherein the training data comprises labeled data comprising a respective labeled user experience measurement for each of the training sets of operational parameter values, and wherein training the proxy model comprises training the one or more artificial neural networks to generate correct measurements of user experience based upon the training data.

A8. The computer-implemented method of aspect A7, wherein the one or more artificial neural networks include one or more recurrent neural networks.

A9. The computer-implemented method of any one of aspects A1 to A8, wherein the training of the proxy model comprises training one or more ground-based processing elements external to the vehicle.

A10. The computer-implemented method of any one of aspects A1 to A9, wherein analyzing the first observed set of operational parameter values comprises analyzing the first observed set of operational parameter values via one or more processors disposed within the vehicle.

A11. The computer-implemented method of any one of aspects A1 to A9, wherein analyzing the first observed set of operational parameter values comprises analyzing the first observed set of operational parameter values via one or more processors of one or ground-based computing devices external to the vehicle.

A12. The computer-implemented method of any one of aspects A1 to A11, wherein the analyzing of the first observed set of operational parameter values is performed during a transit of the vehicle.

A13. The computer-implemented method of any one of aspects A1 to A12, wherein the plurality of operational parameters comprises one or more parameters indicative of one or more hardware components of the vehicle-based communication network or a configuration of the one or more hardware elements of the vehicle-based communication network.

A14. The computer-implemented method of any one of aspects A1 to A13, wherein the plurality of operational parameters comprises one or more parameters indicative of a status, availability, or capability of one or more elements of the vehicle-based communication network.

A15. The computer-implemented method of aspect A14, wherein the one or more elements of the vehicle-based communication network include one or more elements external to the vehicle.

A16. The computer-implemented method of any one of aspects A1 to A15, wherein the plurality of operational parameters comprises one or more parameters indicative of usage behavior of the users of the vehicle-based communication network.

A17. The computer-implemented method of any one of aspects A1 to A16, wherein the plurality of operational parameters comprises one or more parameters indicative of subscription of a user to one or more service terms for the vehicle-based communication network.

A18. The computer-implemented method of any one of aspects A1 to A17, in combination with any other suitable one of aspects A1 to A17.

A19. One or more non-transitory computer readable media comprising instructions that, when executed via one or more processors, cause one or more computing devices to: train, based upon training data, a proxy model to analyze values of a plurality of operational parameters associated with providing a vehicle-based communication network of a vehicle to generate measurements of quality of user experience in the vehicle-based communication network, the training data comprising training sets of operational parameter values associated with uses of the vehicle-based communication network by users; obtain a first observed set of operational parameter values corresponding to use of the vehicle-based communication network by a first user during a first transit of the vehicle; and/or analyze, via the one or more trained proxy model, the first observed set of operational parameter values to generate a first measurement of quality of user experience in the vehicle-based communication network for the first user in the vehicle.

A20. The one or more non-transitory computer readable media of aspect A19, wherein the vehicle is an aircraft.

A21. The one or more non-transitory computer readable media of aspect A19 or A20, wherein the proxy model includes one or more unsupervised machine learning models.

A22. The one or more non-transitory computer readable media of aspect A21, wherein the one or more unsupervised machine learning models include one or more unsupervised clustering models.

A23. The one or more non-transitory computer readable media of aspect A22, wherein the one or more unsupervised clustering models include a k-means clustering model, wherein the instructions to train the proxy model comprise instructions to train the k-means clustering model to categorize respective sets of operational parameters for respective users into one of a plurality of clusters associated with different levels of quality of user experience in the vehicle-based communication network.

A24. The one or more non-transitory computer readable media of any one of aspects A19 to A23, wherein the proxy model includes one or more supervised machine learning models.

A25. The one or more non-transitory computer readable media of aspect A24, wherein the one or more supervised machine learning models include one or more artificial neural networks, wherein the training data comprises labeled data comprising a respective labeled user experience measurement for each of the training sets of operational parameter values, and wherein the instructions to train the proxy model comprise instructions to train the one or more artificial neural networks to generate correct measurements of user experience based upon the training data.

A26. The one or more non-transitory computer readable media of aspect A25, wherein the one or more artificial neural networks include one or more recurrent neural networks.

A27. The one or more non-transitory computer readable media of any one of aspects A19 to A26, wherein the instructions to train the proxy model comprise instructions to train one or more ground-based processing elements external to the vehicle.

A28. The one or more non-transitory computer readable media of any one of aspects A19 to A27, wherein the instructions to analyze the first observed set of operational parameter values comprise instructions to analyze the first observed set of operational parameter values via one or more processors disposed within the vehicle.

A29. The one or more non-transitory computer readable media of any one of aspects A19 to A27, wherein the instructions to analyze the first observed set of operational parameter values comprise instructions to analyze the first observed set of operational parameter values via one or more processors of one or ground-based computing devices external to the vehicle.

A30. The one or more non-transitory computer readable media of any one of aspects A19 to A29, wherein the analyzing of the first observed set of operational parameter values is performed during a transit of the vehicle.

A31. The one or more non-transitory computer readable media of any one of aspects A19 to A30, wherein the plurality of operational parameters comprises one or more parameters indicative of one or more hardware components of the vehicle-based communication network or a configuration of the one or more hardware elements of the vehicle-based communication network.

A32. The one or more non-transitory computer readable media of any one of aspects A19 to A31, wherein the plurality of operational parameters comprises one or more parameters indicative of a status, availability, or capability of one or more elements of the vehicle-based communication network.

A33. The one or more non-transitory computer readable media of aspect A32, wherein the one or more elements of the vehicle-based communication network include one or more elements external to the vehicle.

A34. The one or more non-transitory computer readable media of any one of aspects A19 to A33, wherein the plurality of operational parameters comprises one or more parameters indicative of usage behavior of the users of the vehicle-based communication network.

A35. The one or more non-transitory computer readable media of any one of aspects A19 to A34, wherein the plurality of operational parameters comprises one or more parameters indicative of subscription of a user to one or more service terms for the vehicle-based communication network.

A36. The one or more non-transitory computer readable media of any one of aspects A19 to A35, in combination with any other suitable one of aspects A19 to A35.

A37. The one or more non-transitory computer readable media of any one of aspects A19 to A36, comprising instructions to perform the method of any suitable one of aspects A1 to A18.

A38. A computing system comprising: one or more processors; and one or more memories storing non-transitory instructions that, when executed via the one or more processors, cause the computing system to: train, based upon training data, a proxy model to analyze values of a plurality of operational parameters associated with providing a vehicle-based communication network of a vehicle to generate measurements of quality of user experience in the vehicle-based communication network, the training data comprising training sets of operational parameter values associated with uses of the vehicle-based communication network by users; obtain a first observed set of operational parameter values corresponding to use of the vehicle-based communication network by a first user during a first transit of the vehicle; and/or analyze, via the one or more trained proxy model, the first observed set of operational parameter values to generate a first measurement of quality of user experience in the vehicle-based communication network for the first user in the vehicle.

A39. The computing system of aspect A38, wherein the vehicle is an aircraft.

A40. The computing system of aspect A38 or A39, wherein the proxy model includes one or more unsupervised machine learning models.

A41. The computing system of aspect A40, wherein the one or more unsupervised machine learning models include one or more unsupervised clustering models.

A42. The computing system of aspect A41, wherein the one or more unsupervised clustering models include a k-means clustering model, wherein the instructions to train the proxy model comprise instructions to train the k-means clustering model to categorize respective sets of operational parameters for respective users into one of a plurality of clusters associated with different levels of quality of user experience in the vehicle-based communication network.

A43. The computing system of any one of aspects A38 to A42, wherein the proxy model includes one or more supervised machine learning models.

A44. The computing system of aspect A43, wherein the one or more supervised machine learning models include one or more artificial neural networks, wherein the training data comprises labeled data comprising a respective labeled user experience measurement for each of the training sets of operational parameter values, and wherein the instructions to train the proxy model comprise instructions to train the one or more artificial neural networks to generate correct measurements of user experience based upon the training data.

A45. The computing system of aspect A44, wherein the one or more artificial neural networks include one or more recurrent neural networks.

A46. The computing system of any one of aspects A38 to A45, wherein the instructions to train the proxy model comprise instructions to train one or more ground-based processing elements external to the vehicle.

A47. The computing system of any one of aspects A38 to A46, wherein the instructions to train the proxy model comprise instructions to train one or more ground-based processing elements external to the vehicle.

A48. The computing system of any one of aspects A38 to A46, wherein the instructions to analyze the first observed set of operational parameter values comprise instructions to analyze the first observed set of operational parameter values via one or more processors of one or ground-based computing devices external to the vehicle.

A49. The computing system of any one of aspects A38 to A48, wherein the analyzing of the first observed set of operational parameter values is performed during a transit of the vehicle.

A50. The computing system of any one of aspects A38 to A49, wherein the plurality of operational parameters comprises one or more parameters indicative of one or more hardware components of the vehicle-based communication network or a configuration of the one or more hardware elements of the vehicle-based communication network.

A51. The computing system of any one of aspects A38 to A50, wherein the plurality of operational parameters comprises one or more parameters indicative of a status, availability, or capability of one or more elements of the vehicle-based communication network.

A52. The computing system of aspect A51, wherein the one or more elements of the vehicle-based communication network include one or more elements external to the vehicle.

A53. The computing system of any one of aspects A38 to A52, wherein the plurality of operational parameters comprises one or more parameters indicative of usage behavior of the users of the vehicle-based communication network.

A54. The computing system of any one of aspects A38 to A53, wherein the plurality of operational parameters comprises one or more parameters indicative of subscription of a user to one or more service terms for the vehicle-based communication network.

A55. The computing system of any one of aspects A38 to A54, in combination with any other suitable one of aspects A38 to A54.

A56. The computing system of any one of aspects A38 to A55, configured to execute the instructions of the one or more non-transitory computer readable media of any suitable one of aspects A19 to A37.

A57. The computing system of any one of aspects A38 to A56, configured to implement the method of any suitable one of aspects A1 to A18.

A58. Any one of aspects A1 to A57 in combination with any other suitable one of aspects A1 to A57.

B1. A computer-implemented method implemented via one or more processors, the method comprising: obtaining a first observed set of values of operational parameter corresponding to use of a vehicle-based communication network of a vehicle by a first user during a first transit of the vehicle; via a trained proxy model, analyzing the first observed set of operational parameter values to generate a first measurement of quality of user experience in the vehicle-based communication network for the first user; and/or based upon the first measurement of quality of user experience, causing one or more adjustments to the vehicle-based communication network to improve quality of subsequent usage of the vehicle-based communication network by the first user or by one or more further users.

B2. The computer-implemented method of aspect B1, wherein the vehicle is an aircraft.

B3. The computer-implemented method of aspect B1 or B2, wherein the proxy model includes one or more unsupervised machine learning models.

B4. The computer-implemented method of aspect B3, wherein the one or more unsupervised machine learning models include one or more unsupervised clustering models.

B5. The computer-implemented method of aspect B4, wherein the one or more unsupervised clustering models include a k-means clustering model.

B6. The computer-implemented method of any one of aspects B1 to B5, wherein the proxy model includes one or more supervised machine learning models.

B7. The computer-implemented method of aspect B6, wherein the one or more supervised machine learning models include one or more artificial neural networks.

B8. The computer-implemented method of aspect B7, wherein the one or more artificial neural networks include one or more recurrent neural networks.

B9. The computer-implemented method of any one of aspects B1 to B8, wherein the one or more processors include one or more processors on-board the vehicle.

B10. The computer-implemented method of any one of aspects B1 to B9, wherein the one or more processors include one or more processors in a ground-based network external to the vehicle.

B11. The computer-implemented method of any one of aspects B1 to B10, wherein the analyzing of the first observed set of operational parameter values is performed during a transit of the vehicle, and wherein the first observed set of operational parameter values corresponds to a first portion of the transit of the vehicle.

B12. The computer-implemented method of aspect B11, wherein the causing of the one or more adjustments to the vehicle-based communication network is performed during the transit of the vehicle.

B13. The computer-implemented method of aspect B12, further comprising, subsequent to the causing of the one or more adjustments to the vehicle-based communication network: obtaining a second observed set of values of operational parameter corresponding to use of the vehicle-based communication network by the first user during a second portion of the first transit of the vehicle; via the trained proxy model, analyzing the second observed set of operational parameter values to generate a second measurement of quality of user experience in the vehicle-based communication network for the first user; and/or comparing the first and second measurements of the quality of user experience for the first user to determine an efficacy of the one or more adjustments to the vehicle-based communication network.

B14. The computer-implemented method of any one of aspects B1 to B13, further comprising, subsequent to the causing of the one or more adjustments to the vehicle-based communication network: obtaining a further one or more observed sets of values of operational parameter corresponding to use of the vehicle-based communication network by the first user or another one or more users during a second transit of the vehicle; via the trained proxy model, analyzing the further one or more observed sets of operational parameter values to generate a further one or more measurements of quality of user experience in the vehicle-based communication network for the first user or for the other one or more users; and/or comparing the first measurement to the further one or more measurements to determine an efficacy of the one or more adjustments to the vehicle-based communication network.

B15. The computer-implemented method of any one of aspects B1 to B14, wherein the one or more adjustments comprise a replacement, maintenance, or reconfiguration of one or more hardware components in the vehicle-based communication network.

B16. The computer-implemented method of any one of aspects B1 to B15, wherein the one or more adjustments comprise a replacement, update, reversion, or reconfiguration of one or more software elements in the vehicle-based communication network.

B17. The computer-implemented method of any one of aspects B1 to B16, wherein the one or more adjustments comprise an adjustment to availability of one or more services, applications, or web sites via the vehicle-based communication network.

B18. The computer-implemented method of any one of aspects B1 to B17, in combination with any other suitable one of aspects B1 to B17.

B19. One or more non-transitory computer readable media comprising instructions that, when executed via one or more processors, cause one or more computing devices to: obtain a first observed set of values of operational parameter corresponding to use of a vehicle-based communication network of a vehicle by a first user during a first transit of the vehicle; via a trained proxy model, analyze the first observed set of operational parameter values to generate a first measurement of quality of user experience in the vehicle-based communication network for the first user; and/or based upon the first measurement of quality of user experience, cause one or more adjustments to the vehicle-based communication network to improve quality of subsequent usage of the vehicle-based communication network by the first user or by one or more further users.

B20. The one or more non-transitory computer readable media of aspect B19, wherein the vehicle is an aircraft.

B21. The one or more non-transitory computer readable media of aspect B19 or B20, wherein the proxy model includes one or more unsupervised machine learning models.

B22. The one or more non-transitory computer readable media of aspect B21, wherein the one or more unsupervised machine learning models include one or more unsupervised clustering models.

B23. The one or more non-transitory computer readable media of aspect B22, wherein the one or more unsupervised clustering models include a k-means clustering model.

B24. The one or more non-transitory computer readable media of any one of aspects B19 to B23, wherein the proxy model includes one or more supervised machine learning models.

B25. The one or more non-transitory computer readable media of aspect B24, wherein the one or more supervised machine learning models include one or more artificial neural networks.

B26. The one or more non-transitory computer readable media of aspect B25, wherein the one or more artificial neural networks include one or more recurrent neural networks.

B27. The one or more non-transitory computer readable media of any one of aspects B19 to B26, wherein the one or more processors include one or more processors on-board the vehicle.

B28. The one or more non-transitory computer readable media of any one of aspects B19 to B27, wherein the one or more processors include one or more processors in a ground-based network external to the vehicle.

B29. The one or more non-transitory computer readable media of any one of aspects B19 to B28, wherein the analyzing of the first observed set of operational parameter values is performed during a transit of the vehicle, and wherein the first observed set of operational parameter values corresponds to a first portion of the transit of the vehicle.

B30. The one or more non-transitory computer readable media of aspect B29, wherein the causing of the one or more adjustments to the vehicle-based communication network is performed during the transit of the vehicle.

B31. The one or more non-transitory computer readable media of aspect B30, wherein the instructions, when executed via the one or more processors, further cause the one or more computing devices to: obtain a second observed set of values of operational parameter corresponding to use of the vehicle-based communication network by the first user during a second portion of the first transit of the vehicle; via the trained proxy model, analyze the second observed set of operational parameter values to generate a second measurement of quality of user experience in the vehicle-based communication network for the first user; and/or compare the first and second measurements of the quality of user experience for the first user to determine an efficacy of the one or more adjustments to the vehicle-based communication network.

B32. The one or more non-transitory computer readable media of any one of aspects B19 to B31, wherein the instructions, when executed via the one or more processors, further cause the one or more computing devices to: obtain a further one or more observed sets of values of operational parameter corresponding to use of the vehicle-based communication network by the first user or another one or more users during a second transit of the vehicle; via the trained proxy model, analyze the further one or more observed sets of operational parameter values to generate a further one or more measurements of quality of user experience in the vehicle-based communication network for the first user or for the other one or more users; and/or compare the first measurement to the further one or more measurements to determine an efficacy of the one or more adjustments to the vehicle-based communication network.

B33. The one or more non-transitory computer readable media of any one of aspects B19 to B32, wherein the one or more adjustments comprise a replacement, maintenance, or reconfiguration of one or more hardware components in the vehicle-based communication network.

B34. The one or more non-transitory computer readable media of any one of aspects B19 to B33, wherein the one or more adjustments comprise a replacement, update, reversion, or reconfiguration of one or more software elements in the vehicle-based communication network.

B35. The one or more non-transitory computer readable media of any one of aspects B19 to B34, wherein the one or more adjustments comprise an adjustment to availability of one or more services, applications, or web sites via the vehicle-based communication network.

B36. The one or more non-transitory computer readable media of any one of aspects B19 to B35, in combination with any other suitable one of aspects B19 to B35.

B37. The one or more non-transitory computer readable media of any one of aspects B19 to B36, comprising instructions to perform the method of any suitable one of aspects B1 to B18.

B38. A computing system comprising: one or more processors; and one or more memories storing non-transitory instructions that, when executed via the one or more processors, cause the computing system to: obtain a first observed set of values of operational parameter corresponding to use of a vehicle-based communication network of a vehicle by a first user during a first transit of the vehicle; via a trained proxy model, analyze the first observed set of operational parameter values to generate a first measurement of quality of user experience in the vehicle-based communication network for the first user; and/or based upon the first measurement of quality of user experience, cause one or more adjustments to the vehicle-based communication network to improve quality of subsequent usage of the vehicle-based communication network by the first user or by one or more further users.

B39. The computing system of aspect B38, wherein the vehicle is an aircraft.

B40. The computing system of aspect B38 or B39, wherein the proxy model includes one or more unsupervised machine learning models.

B41. The computing system of aspect B40, wherein the one or more unsupervised machine learning models include one or more unsupervised clustering models.

B42. The computing system of aspect B41, wherein the one or more unsupervised clustering models include a k-means clustering model.

B43. The computing system of any one of aspects B38 to B42, wherein the proxy model includes one or more supervised machine learning models.

B44. The computing system of aspect B43, wherein the one or more supervised machine learning models include one or more artificial neural networks.

B45. The computing system of aspect B44, wherein the one or more artificial neural networks include one or more recurrent neural networks.

B46. The computing system of any one of aspects B38 to B45, wherein the one or more processors include one or more processors on-board the vehicle.

B47. The computing system of any one of aspects B38 to B46, wherein the one or more processors include one or more processors in a ground-based network external to the vehicle.

B48. The computing system of any one of aspects B38 to B47, wherein the analyzing of the first observed set of operational parameter values is performed during a transit of the vehicle, and wherein the first observed set of operational parameter values corresponds to a first portion of the transit of the vehicle.

B49. The computing system of aspect B48, wherein the causing of the one or more adjustments to the vehicle-based communication network is performed during the transit of the vehicle.

B50. The computing system of aspect B49, wherein the instructions, when executed via the one or more processors, further cause the computing system to: obtain a second observed set of values of operational parameter corresponding to use of the vehicle-based communication network by the first user during a second portion of the first transit of the vehicle; via the trained proxy model, analyze the second observed set of operational parameter values to generate a second measurement of quality of user experience in the vehicle-based communication network for the first user; and/or compare the first and second measurements of the quality of user experience for the first user to determine an efficacy of the one or more adjustments to the vehicle-based communication network.

B51. The computing system of any one of aspects B38 to B50, wherein the instructions, when executed via the one or more processors, further cause the computing system to: obtain a further one or more observed sets of values of operational parameter corresponding to use of the vehicle-based communication network by the first user or another one or more users during a second transit of the vehicle; via the trained proxy model, analyze the further one or more observed sets of operational parameter values to generate a further one or more measurements of quality of user experience in the vehicle-based communication network for the first user or for the other one or more users; and/or compare the first measurement to the further one or more measurements to determine an efficacy of the one or more adjustments to the vehicle-based communication network.

B52. The computing system of any one of aspects B38 to B51, wherein the one or more adjustments comprise a replacement, maintenance, or reconfiguration of one or more hardware components in the vehicle-based communication network.

B53. The computing system of any one of aspects B38 to B52, wherein the one or more adjustments comprise a replacement, update, reversion, or reconfiguration of one or more software elements in the vehicle-based communication network.

B54. The computing system of any one of aspects B38 to B53, wherein the one or more adjustments comprise an adjustment to availability of one or more services, applications, or web sites via the vehicle-based communication network.

B55. The computing system of any one of aspects B38 to B54, in combination with any other suitable one of aspects B38 to B54.

B56. The computing system of any one of aspects B38 to B55, configured to execute the instructions of the one or more non-transitory computer readable media of any suitable one of aspects B19 to B37.

B57. The computing system of any one of aspects B38 to B56, configured to implement the method of any suitable one of aspects B1 to B18.

B58. Any one of aspects B1 to B57 in combination with any other suitable one of aspects B1 to B57.

C1. Any one of aspects A1 to A58 or B1 to B58, in combination with any other suitable one of aspects A1 to A58 or B1 to B58

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computer-implemented method implemented via one or more processors, the computer-implemented method comprising:

obtaining a first observed set of operational parameter values corresponding to use of a vehicle-based communication network of a vehicle by a first user during a first transit of the vehicle;

obtaining, based at least in part on the first observed set of operational parameter values, a first output of a trained proxy model, wherein the first output comprises a first measurement of quality of user experience for the first user of the vehicle-based communication network during the first transit of the vehicle; and causing, based at least in part on the first measurement of quality of user experience, one or more adjustments to the vehicle-based communication network, wherein a second measurement of quality of user experience for the first user or one or more second users of the vehicle-based communication network exceeds the first measurement of quality of user experience based at least in part on the one or more adjustments.

2. The computer-implemented method of claim 1, wherein the vehicle is an aircraft.

3. The computer-implemented method of claim 1, wherein the trained proxy model includes a k-means clustering model.

4. The computer-implemented method of claim 1, wherein the trained proxy model includes one or more artificial neural networks.

5. The computer-implemented method of claim 1, wherein the one or more processors include one or more processors on-board the vehicle.

6. The computer-implemented method of claim 1, wherein the one or more processors include one or more processors in a ground-based network external to the vehicle.

7. The computer-implemented method of claim 1, wherein the obtaining of the first output of the trained proxy model is performed during a transit of the vehicle, wherein the first observed set of operational parameter values corresponds to a first portion of the transit of the vehicle, and wherein the causing of the one or more adjustments to the vehicle-based communication network is performed during the transit of the vehicle.

8. The computer-implemented method of claim 7, further comprising, subsequent to the causing of the one or more adjustments to the vehicle-based communication network:

obtaining a second observed set of operational parameter values corresponding to use of the vehicle-based communication network by the first user during a second portion of the first transit of the vehicle;

obtaining, based at least in part on the second observed set of operational parameter values, a second output of the trained proxy model, wherein the second output comprises the second measurement of quality of user experience for the first user of the vehicle-based communication network during the second portion of the first transit of the vehicle; and comparing the first and second measurements of the quality of user experience for the first user to determine an efficacy of the one or more adjustments to the vehicle-based communication network.

9. The computer-implemented method of claim 1, further comprising, subsequent to the causing of the one or more adjustments to the vehicle-based communication network:

obtaining a further one or more observed sets of operational parameter values corresponding to use of the vehicle-based communication network by the first user or the one or more second users during a second transit of the vehicle;

obtaining, based at least in part on the further one or more observed sets of operational parameter values, one or more second outputs of the trained proxy model, wherein the one or more second outputs comprise the second measurement of quality of user experience for the first user or for the one or more second users of the vehicle-based communication network during the second transit of the vehicle; and comparing the first measurement to the further one or more measurements to determine an efficacy of the one or more adjustments to the vehicle-based communication network.

10. The computer-implemented method of claim 1, wherein the one or more adjustments comprise a replacement, maintenance, or reconfiguration of one or more hardware components in the vehicle-based communication network.

11. The computer-implemented method of claim 1, wherein the one or more adjustments comprise a replacement, update, reversion, or reconfiguration of one or more software elements in the vehicle-based communication network.

12. The computer-implemented method of claim 1, wherein the one or more adjustments comprise an adjustment to availability of one or more services, applications, or web sites via the vehicle-based communication network.

13. One or more non-transitory computer readable media comprising instructions that, when executed via one or more processors, cause one or more computing devices to:

obtain a first observed set of operational parameter values corresponding to use of a vehicle-based communication network of a vehicle by a first user during a first transit of the vehicle;

obtain, based at least in part on the first observed set of operational parameter values, a first output of a trained proxy model, wherein the first output comprises a first measurement of quality of user experience for the first user of the vehicle-based communication network during the first transit of the vehicle; and cause, based at least in part on the first measurement of quality of user experience, one or more adjustments to the vehicle-based communication network, wherein a second measurement of quality of user experience for the first user or one or more second users of the vehicle-based communication network exceeds the first measurement of quality of user experience based at least in part on the one or more adjustments.

14. The one or more non-transitory computer readable media of claim 13, wherein the vehicle is an aircraft.

15. The one or more non-transitory computer readable media of claim 13, wherein the trained proxy model includes a k-means clustering model.

16. The one or more non-transitory computer readable media of claim 13, wherein the trained proxy model includes one or more artificial neural networks.

17. The one or more non-transitory computer readable media of claim 13, wherein the one or more processors include one or more processors on-board the vehicle.

18. The one or more non-transitory computer readable media of claim 13, wherein the one or more processors include one or more processors in a ground-based network external to the vehicle.

19. The one or more non-transitory computer readable media of claim 13, wherein the obtaining of the first output of the trained proxy model is performed during a transit of the vehicle, wherein the first observed set of operational parameter values corresponds to a first portion of the transit of the vehicle, and wherein the causing of the one or more adjustments to the vehicle-based communication network is performed during the transit of the vehicle.

20. The one or more non-transitory computer readable media of claim 19, wherein the instructions, when executed via the one or more processors, further cause the one or more computing devices to:

obtain a second observed set of operational parameter values corresponding to use of the vehicle-based communication network by the first user during a second portion of the first transit of the vehicle;

obtain, based at least in part on the second observed set of operational parameter values, a second output of the trained proxy model, wherein the second output comprises the second measurement of quality of user experience for the first user of the vehicle-based communication network during the second portion of the first transit of the vehicle; and compare the first and second measurements of the quality of user experience for the first user to determine an efficacy of the one or more adjustments to the vehicle-based communication network.

21. The one or more non-transitory computer readable media of claim 13, wherein the instructions, when executed via the one or more processors, further cause the one or more computing devices to:

obtain a further one or more observed sets of operational parameter values corresponding to use of the vehicle-based communication network by the first user or the one or more second users during a second transit of the vehicle;

obtain, based at least in part on the further one or more observed sets of operational parameter values, one or more second outputs of the trained proxy model, wherein the one or more second outputs comprise the second measurement of quality of user experience for the first user or for the one or more second users of the vehicle-based communication network during the second transit of the vehicle; and compare the first measurement to the further one or more measurements to determine an efficacy of the one or more adjustments to the vehicle-based communication network.

22. The one or more non-transitory computer readable media of claim 13, wherein the one or more adjustments comprise a replacement, maintenance, or reconfiguration of one or more hardware components in the vehicle-based communication network.

23. The one or more non-transitory computer readable media of claim 13, wherein the one or more adjustments comprise a replacement, update, reversion, or reconfiguration of one or more software elements in the vehicle-based communication network.

24. The one or more non-transitory computer readable media of claim 13, wherein the one or more adjustments comprise an adjustment to availability of one or more services, applications, or web sites via the vehicle-based communication network.

25. A computing system comprising:

one or more processors; and one or more memories storing non-transitory instructions that, when executed via the one or more processors, cause the computing system to:

obtain a first observed set of operational parameter values corresponding to use of a vehicle-based communication network of a vehicle by a first user during a first transit of the vehicle;

obtain, based at least in part on the first observed set of operational parameter values, a first output of a trained proxy model, wherein the first output comprises a first measurement of quality of user experience for the first user of the vehicle-based communication network during the first transit of the vehicle; and cause, based at least in part on the first measurement of quality of user experience, one or more adjustments to the vehicle-based communication network, wherein a second measurement of quality of user experience for the first user or one or more second users of the vehicle-based communication network exceeds the first measurement of quality of user experience based at least in part on the one or more adjustments.

* * * * *